(12) United States Patent
Hinton et al.

(10) Patent No.: US 8,589,912 B2
(45) Date of Patent: Nov. 19, 2013

(54) LOOSELY COUPLED PRODUCT INSTALL AND CONFIGURATION

(75) Inventors: Heather M. Hinton, Austin, TX (US); Ivan M. Milman, Austin, TX (US); Patrick R. Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1669 days.

(21) Appl. No.: 11/770,860

(22) Filed: Jun. 29, 2007

(65) Prior Publication Data

US 2009/0007094 A1 Jan. 1, 2009

(51) Int. Cl.
*G06F 9/445* (2006.01)

(52) U.S. Cl.
USPC ............ 717/174; 717/175; 717/176; 717/177

(58) Field of Classification Search
USPC ........................................................ 717/178
See application file for complete search history.

(56) References Cited

U.S. PATENT DOCUMENTS

| | | | |
|---|---|---|---|
| 5,793,982 A | 8/1998 | Shreader et al. | 395/200.62 |
| 6,182,275 B1* | 1/2001 | Beelitz et al. | 717/175 |
| 6,282,711 B1* | 8/2001 | Halpern et al. | 717/175 |
| 6,618,857 B1* | 9/2003 | Marino et al. | 717/175 |
| 6,845,505 B1 | 1/2005 | Adunuthula et al. | 718/105 |
| 6,948,059 B1* | 9/2005 | Sprecher et al. | 713/100 |
| 7,475,396 B2* | 1/2009 | Kapoor | 717/178 |
| 7,530,065 B1* | 5/2009 | Ciudad et al. | 717/174 |
| 7,574,706 B2* | 8/2009 | Meulemans et al. | 717/174 |
| 7,707,573 B1* | 4/2010 | Marmaros et al. | 717/178 |
| 7,793,284 B2* | 9/2010 | Mason et al. | 717/174 |
| 2003/0037327 A1* | 2/2003 | Cicciarelli et al. | 717/178 |
| 2004/0006586 A1 | 1/2004 | Melchione et al. | 709/201 |
| 2004/0117783 A1* | 6/2004 | Kaminsky et al. | 717/169 |
| 2004/0255291 A1 | 12/2004 | Sierer et al. | |
| 2005/0120331 A1* | 6/2005 | Asare et al. | 717/104 |
| 2005/0120344 A1* | 6/2005 | Asare et al. | 717/174 |
| 2005/0125529 A1 | 6/2005 | Brockway et al. | 709/224 |
| 2005/0132359 A1* | 6/2005 | McGuire et al. | 717/175 |
| 2005/0262503 A1 | 11/2005 | Kane | 717/176 |
| 2005/0278748 A1 | 12/2005 | Koh et al. | 725/61 |
| 2006/0010434 A1 | 1/2006 | Herzog et al. | |
| 2006/0059029 A1 | 3/2006 | Chalasani et al. | 705/8 |
| 2006/0101457 A1* | 5/2006 | Zweifel et al. | 717/174 |
| 2006/0136873 A1 | 6/2006 | Herter et al. | 717/114 |

(Continued)

OTHER PUBLICATIONS

G. Kal et al.; "Managing Application Services over Service Provider Networks: Architecture and Dependency Analysis"; 2000 IEEE; pp. 61-74; <http://ieeexplore.ieee.org/stamp/stamp.jsp?tp=&arnumber=830375>.*

(Continued)

*Primary Examiner* — Thuy Dao
*Assistant Examiner* — Cuong V Luu
(74) *Attorney, Agent, or Firm* — Terrile, Cannatti, Chambers & Holland, LLP; Michael Rocco Cannatti

(57) ABSTRACT

A method, system and program are provided for managing the installation and configuration of a software product by using a proxy service to loosely couple the installation and/or configuration of constituent modules within the installation/configuration flow of the software product. The proxy service invokes the installation/configuration processing of an existing software component, thereby reducing the complexity associated with installing new component installation processes every time a component is to be supported, especially where the software products and new component(s) do not share the same installation/configuration platforms.

20 Claims, 18 Drawing Sheets

(56) References Cited

U.S. PATENT DOCUMENTS

| | | | |
|---|---|---|---|
| 2006/0136897 A1 | 6/2006 | Laxminarayan et al. | 717/168 |
| 2006/0224472 A1* | 10/2006 | May | 705/28 |
| 2007/0006222 A1* | 1/2007 | Maier et al. | 717/174 |
| 2007/0106984 A1* | 5/2007 | Birk Olsen et al. | 717/174 |
| 2007/0220509 A1* | 9/2007 | Shwartz et al. | 717/174 |
| 2008/0115124 A1* | 5/2008 | Remer | 717/178 |
| 2008/0178172 A1* | 7/2008 | Dossa et al. | 717/174 |
| 2009/0007097 A1 | 1/2009 | Hinton et al. | |

OTHER PUBLICATIONS

Fabio Kon et al.; "Dynamic Resource Management and Automatic Cinfiguration of Distributed Component Systems"; 2001 usenix.org; 31 pages, <http://static.usenix.org/events/coots01/full_papers/kon/kon_html/>.*

Eelco Dolstra; "Integrating Software Construction and Software Deployment"; 2001/2003 Springer; pp. 102-117; <http://link.springer.com/chapter/10.1007%2F3-540-39195-9_8?LI=true#>.*

Slinger Jansen et al.; "Modelling Deployment Using Feature Descriptions and State Models for Component-Based Software Product Families"; 2005 Springer; pp. 119-133; <http://link.springer.com/chapter/10.1007%2F11590712_10?LI=true#>.*

Fabio Kon et al.; "Dependence Management in Component4Based Distributed Systems"; 2000 IEEE; pp. 26-36; <http://ieeexplore.ieee.org/stamp/stamp.jsp?tp=&arnumber=824310>.*

Alexander Keller; "Classification and Computation of Dependencies for Distributed Management"; 2000 IEEE; pp. 78-83; <http://ieeexplore.ieee.org/stamp/stamp.jsp?tp=&arnumber=860604>.*

* cited by examiner

TFIM: Configure of Existing WAS

WAS Information
  WAS Administrative User ID
  [ WASadmin ]
  WAS Administrative User Password
  [ ******** ]
20 -- Server 1 Host Name
  [ myhostA.mydomain.com ]
  Server 1 Port
  [ 7135 ]
21 -- Server 2 Host Name
  [ myhostA.mydomain.com ]
  Server 2 Listener Port
  [ 7136 ]
22 -- SSL Certificate Lifecycle (days)
  [ 365 ]
  SSL Connection Timeout
  [ myhost.mydomain.com ]

[ < Back ]  [ Next > ]  [ Cancel ]

TFIM: WAS Installation

WAS Installation/Configuration has successfully completed

Status Details
                                    [ Next > ]  [ Cancel ]
  ......
25 --/                               26 --/      27 --/

TFIM: F-SSO Functionality

TFIM F-SSO requires TAMeB. How will TFIM leverage this component functionality?

● Custom installation of TAMeB
     Available for re-use by other products
29 -- ○ Custom installation of TAMeB
       NOT available for re-use by other products
30 -- ○ Re-use an existing deployment of TAMeB

[ Next > ]  [ Cancel ]

LOOSELY COUPLED PRODUCT INSTALL AND CONFIGURATION

BACKGROUND OF THE INVENTION

1. Field of the Invention

The present invention is directed in general to the field of electronic distribution of software in computer networks. In one aspect, the present invention relates to the management of software component installation, configuration and deployment across a distributed network.

2. Description of the Related Art

Software products are increasingly designed to use or re-use existing software modules or components. For example, components (sometimes also known as middleware)—such as Lightweight Directory Access Protocol (LDAP) modules such as the Tivoli Directory Server (TDS) or application servers/J2EE containers as provided by WebSphere Application Server (WAS) modules—may be embedded as part of a software product, or may be required as a product dependency, even if not embedded. In such cases, the installation and configuration of such components as part of the installation of the software product can increase the complexity and development costs to the installation of the software product, particularly where new components are added to the software product. An example of such a software product is the Tivoli Access Manager for eBusiness (TAMeB) which is designed to leverage a number of components, such as WAS and LDAP, which must be installed in anticipation of the installation of TAMeB product. When new components are added to the TAMeB product, the TAMeB product must either separately include the installation/configuration of the components into the TAMeB installation (increasing the complexity and development cost of the TAMeB installation by requiring the re-writing of the TAMeB product's installation process without the re-use of the component's existing installation/configuration process), or require that the components be pre-installed independently (increasing the complexity of the overall installation for the end user). The complexity and cost associated with integrating or coupling the independent installation/configuration processing is especially acute in scenarios where the new components do not share the same installation/configuration platform with the main software product (e.g., ISMP versus response file/CLI scripts).

Accordingly, there is a need for a system and method of leveraging the use of existing software components while reducing the complexity and cost associated with separately embedding the installation, configuration and deployment of such components in the installation of the main software product. In addition, there is a need for a system and method to efficiently reuse software components without imposing the tight integration/coupling requirements of an independent installation/configuration processing. There is also a need for a way to leverage the installation/configuration processing of an individual component into the installation of a software product, even when the software product and component do share the same installation/configuration platform. Further limitations and disadvantages of conventional installation/configuration processing solutions will become apparent to one of skill in the art after reviewing the remainder of the present application with reference to the drawings and detailed description which follow.

SUMMARY OF THE INVENTION

A system and methodology are provided for managing the installation and configuration of a software product which includes one or more existing software components, where an installation proxy service is used to invoke the component's individual installation processing within the flow of the software product's installation. In similar fashion, a proxy service can invoke a component's individual configuration processing within the overall flow of the software product's installation. By using a proxy service to loosely couple the installation/configuration of software components into the installation of a software product, different installation/configuration processes can be linked into one installation/configuration flow, even if they are not normally compatible approaches. As a result, each component can build its own installation which can be re-used by each exploiting product. This saves each product that uses a component (e.g., LDAP) from having to implement its own installation of this component while allowing this component to be installed "in line" with the product. As a result, the product does not have to force the component to be already installed, using the component-provided installation, before the install of the product is attempted. This approach also allows for the discovery and re-use of existing installations of a required component, so that the in-line installation of a pre-requisite component can be skipped altogether if a suitable installed instance of the required component is found. In addition, new (third party) components can be incorporated into a product without requiring a new component installation in the product installation, thereby simplifying the integration of the installation/configuration processes for the new (third party) components, especially where the products and new component(s) do not share the same installation/configuration platforms.

In accordance with various embodiments, a system, methodology and program are disclosed for installing a software product within a data processing system. As disclosed, a software product is installed by identifying one or more pre-requisite components of the software product during an installation process flow for the software product. For each prerequisite component, an option to install a new, product-specific instance of the component (a "new provider" option) or search for an existing instance for which re-use is provided and supported. If the option to install a new, product-specific instance is selected, the install proxy brokers the installation of the specified component. If the option to re-use or share an existing instance of the component is selected, a provider option list is built that identifies one or more external provider options, where an external provider option specifies a prerequisite component that has previously been installed and can be "shared" with the software product. In selected embodiments, the list is built by accessing a deployed product itemization data store, such as a configuration management database (CMDB), which stores information identifying (all) deployed components in a distributed data processing system and where this list of deployed components can be used to build a list of provider options from the plurality of previously deployed components. In addition to identifying the deployed and re-usable components, the CMDB may be used to store and provide the list of components to build the list of possible re-usable components. With such a database, a possible optimization includes an initial search that may be performed to identify possible re-usable components before querying the user to see if a component should be newly installed or re-used, thereby providing only the "install new" option if no re-usable components are available. The installation process may advantageously be implemented by processing a component in its entirety before the installation process attempts to install/configure the next component, thereby simplifying the recovery efforts required to back out of an installation/configuration process if something should fail along the way.

Upon receiving a user selection for the installation of a product-specific instance of the component, a proxy service invokes, within the installation process flow for the software product, a component installation process of the prerequisite component identified by the new provider option. In selected embodiments, the component installation process is invoked by building a request to an installation proxy service which may include default values for the installation process of the prerequisite component. Note that in some cases, this prerequisite component may in turn have one, or more, pre-requisite component(s) and so the install proxy, as part of installing this component, may in turn invoke the entire process to handle the installation of the component's pre-requisite components. For example, a TFIM product may have a "component" requirement on the TAMeB product, which in turn has component dependencies on an LDAP product (where the TDS LDAP implementation in turn depends on IBM DB2) and in some cases, WAS (depending on how TAMeB is going to be deployed and used), where this TAMeB WAS may or may not re-use the WAS instance required by TFIM.

As part of the installation of each component, the install proxy may also handle the high-level runtime-specific "configuration" of each component, where this configuration is required to completely deploy the component so that it is available for use by the software product. Installation-level configuration typically includes information such as component administrator passwords, identification of communication ports, use of SSL for secure communication with the component, and so on. This is required to complete the installation so that the product can be configured for runtime-usage. Runtime-level configuration may include, for example, the configuration of runtime parameters governing the component's audit level settings, or the creation of a domain or cell within an application server as a component (into which the product may be deployed).

BRIEF DESCRIPTION OF THE DRAWINGS

Selected embodiments of the present invention may be understood, and its numerous objects, features and advantages obtained, when the following detailed description is considered in conjunction with the following drawings, in which:

FIGS. 5-20 show an example sequence of installation screens which may be enabled by the install proxy and displayed in the course of installing required components in an example software product, where software product has a dependency on one or more prerequisite components;

DETAILED DESCRIPTION

Figure 1A:
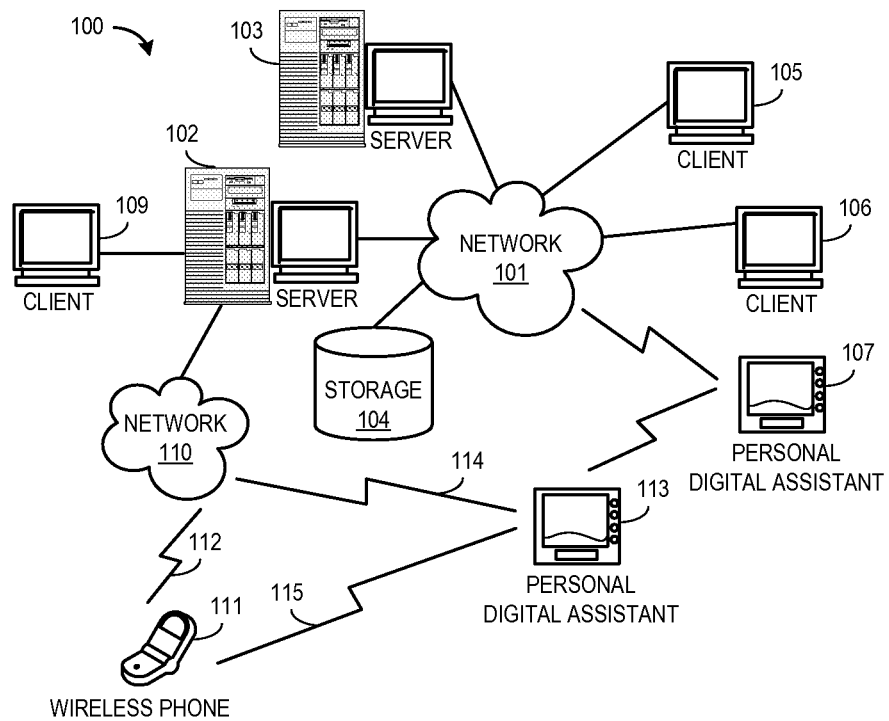
FIG. 1A depicts a distributed data processing system in which the present invention may be implemented.

A method, system and program are disclosed for installing and/or configuring a component function (e.g., TDS LDAP or Common Audit and Reporting Service (CARS)) in a software product (e.g., TAMeB or Tivoli Federated Identity Manager (TFIM)) by invoking an installation/configuration proxy service during the installation/configuration of the software product. The proxy service identifies any available components that can provide the required pre-requisite (component provided) functionality, typically by leveraging data repositories and warehouses such as a change/configuration management database (CCMDB), to identify other sources to provide the required functionality. Based on the available options, the proxy service prompts the user to select a particular functionality provider, and then invokes the installation/configuration process of the selected functionality provider. The invocation of the proxy service may use assembled information (e.g., previously collected hostnames, platforms, endpoints, etc.) as default values for the selected component installation/configuration. Likewise, the functionality provider install/config process may broker a direct interaction with the administrator (running the process) to prompt the admin for additional required information. When the functionality provider is completed with its installation/configuration process, control is returned to the proxy service for appropriate action, such as indicating whether the installation/configuration failed or succeeded. In turn, the proxy service returns processing control to the product's installation/configuration process. By invoking the proxy service, a software product can avoid embedding or tightly coupling the installation/configuration of the component function into the installation/configuration process for the product. In addition, the disclosed proxy service may be used to govern or control the complete uninstall or unconfig operation of a component as part of the software product installation if the installation or configuration of the component, a downstream component or the software product fails or is cancelled by the user, and also as part of the uninstall (after successful install) of the software product.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

With reference now to the figures, FIG. 1A depicts a distributed data processing system 100 in which the present invention may be implemented. The distributed data processing system 100 includes a network 101, which is a medium that may be used to provide communications links between various devices and computers connected together within distributed data processing system 100. The network 101 may include permanent connections, such as wire or fiber optic cables, or temporary connections made through telephone or wireless communications. In the depicted example, the network 101 may be implemented in whole or in part with a worldwide collection of networks and gateways (e.g., the Internet) that use various protocols to communicate with one another, such as LDAP (Lightweight Directory Access Protocol), TCP/IP (Transport Control Protocol/Internet Protocol), HTTP (HyperText Transport Protocol), etc. Of course, the distributed data processing system 100 may also include a number of different types of networks, such as, for example, an intranet, a local area network (LAN), or a wide area network (WAN). For example, server 102 directly supports client 109 and network 110, which incorporates wireless communication links 112, 114 for connecting to a network-enabled phone 111 and PDA 113, respectively. In turn, wireless phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116. FIG. 1A also shows that server 102 and server 103 are connected to the network 101 along with storage unit 104. In addition, clients 105-107 may be connected to the network 101. The clients 105-107 and servers 102-103 may be represented by a variety of computing devices, such as mainframes, personal computers, personal digital assistants (PDAs), etc. The distributed data processing system 100 may include additional servers, clients, routers, other devices, and peer-to-peer architectures that are not shown. While the present invention may be implemented on a variety of hardware platforms and software environments, FIG. 1A is intended as an example of a heterogeneous computing environment and not as an architectural limitation for the present invention.

Figure 1B:
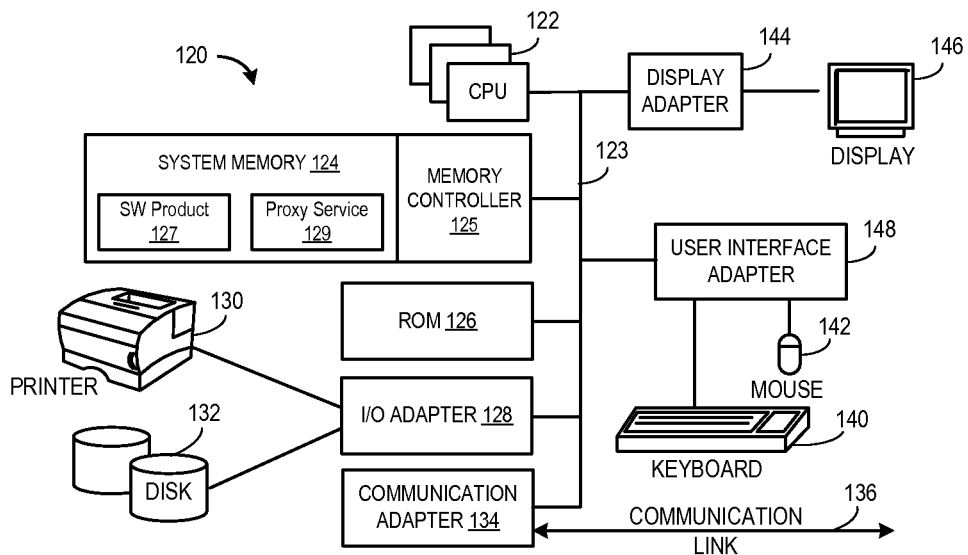
FIG. 1B depicts a computer architecture that may be used within a data processing system in which the present invention may be implemented.

Referring now to FIG. 1B, an architecture of a data processing system 120, such as those shown in FIG. 1A, is diagrammatically depicted in which selected embodiments of the present invention may be implemented. The depicted data processing system 120 contains one or more central processing units (CPUs) 122, a system memory 124, and a system bus 123 that couples various system components, including the processing unit(s) 122 and the system memory 124.

System memory 124 may be implemented with computer storage media in the form of nonvolatile memory and/or volatile memory in the form of a collection of dynamic random access memory (DRAM) modules that store data and instructions that are immediately accessible to and/or presently operated on by the processing unit(s) 122. In an example implementation, the system memory 124 includes a software product 127 having one or more component modules which are to be installed and/or configured. In addition or in the alternative, the system memory 124 may include a proxy server 129 to assist with the installation and/or configuration of the component modules. As will be appreciated, the software product 127 and/or proxy server 129 can be stored in any memory location, including other parts of the system memory 124, the ROM 126, or even in external memory (e.g., 132). System memory may also have an associated memory controller 125 for controlling access to and from system memory 124.

The depicted system bus 123 may be implemented as a local Peripheral Component Interconnect (PCI) bus, Accelerated Graphics Port (AGP) bus, Industry Standard Architecture (ISA) bus, or any other desired bus architecture. System bus 123 is connected to a communication adapter 134 that provides access to communication link 136, a user interface adapter 148 that connects various user devices (such as keyboard 140, mouse 142, or other devices not shown, such as a touch screen, stylus, or microphone), and a display adapter 144 that connects to a display 146. The system bus 123 also interconnects the system memory 124, read-only memory 126, and input/output adapter 128 which supports various I/O devices, such as printer 130, disk units 132, or other devices not shown, such as an audio output system, etc. The I/O adapter 128 may be implemented as a small computer system interface (SCSI) host bus adapter that provides a connection to other removable/non-removable, volatile/nonvolatile computer storage media, such as disk units 132 which may be implemented as a hard disk drive that reads from or writes to non-removable, nonvolatile magnetic media, a tape drive that reads from or writes to a tape drive system, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

As will be appreciated, the hardware used to implement the data processing system 120 can vary, depending on the system implementation. For example, hardware or peripheral devices, such as flash read-only memory (ROM), equivalent nonvolatile memory, or optical disk drives and the like, may be used in addition to or in place of the hardware depicted in FIG. 1B. In addition to being able to be implemented on a variety of hardware platforms, the present invention may be implemented in a variety of software environments so that different operating systems (such as Linux, Microsoft, AIX, BSD, Mac OS, HP-UX and Java-based runtime environments) are used to execute different program applications (such as a word processing, graphics, video, or browser program). In other words, while different hardware and software components and architectures can be used to implement different data processing systems (such as a Web-enabled or network-enabled communication device or a fully featured desktop workstation), such hardware or architectural examples are not meant to imply limitations with respect to the system clock management techniques disclosed herein.

Figure 2:
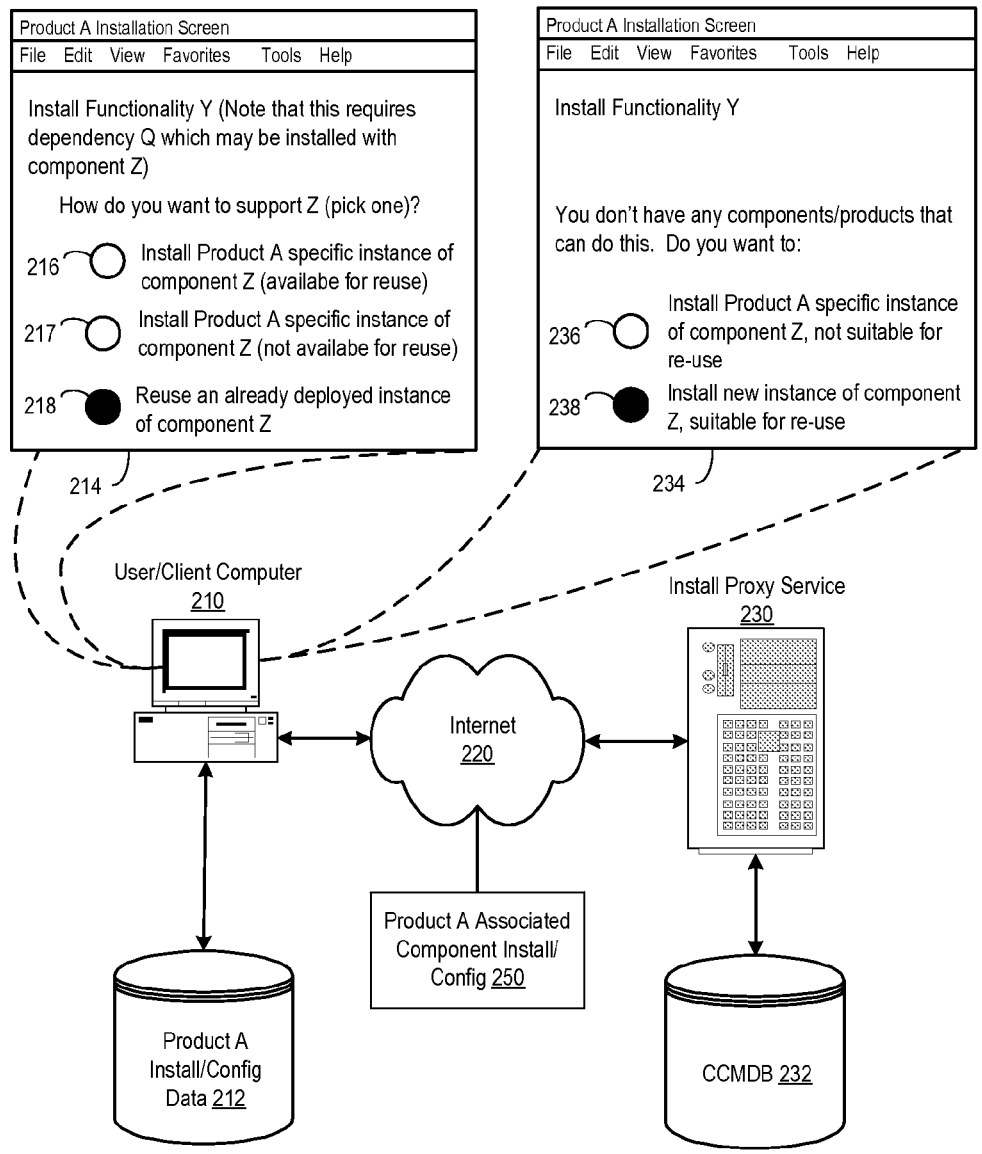
FIG. 2 depicts an example installation proxy service that can be used to install and/or configure a software product.

FIG. 2 depicts an example of how an installation proxy service 230 can be used by a client computer 210 to install and/or configure a software product (e.g., Product A, e.g., TFIM) having a required functionality (e.g., Functionality Y. e.g., F-SSO Functionality). Though illustrated as being implemented in a separate server computer, it will be appreciated that the install proxy service may also be implemented on the client computer 210, or at any other data processing system. To support TFIM with F-SSO functionality, a reverse proxy "Point of Contact" may be required and provided with a pre-requisite on TAMeB. For example, if the software product being installed is TFIM (representing Product A), for federated single sign-on (F-SSO), the required component-level functionality may provide authentication and session management (enablement required for functionality Y associated with Product A) as provided by pre-requisite component TAMeB (component Z). In accordance with selected embodiments, the required functionality may be provided by a new installation of the software product, or may be provided by leveraging an existing deployment of TAMeB. As depicted by the installation screen 214 shown in FIG. 2, the installer/administrator is given the choice as to which provider option to use.

The choices available to the administrator are to install a new instance of component Z, or to (attempt to) reuse an existing instance. If the "new instance" approach, which allows for re-use of the component installation process, is selected as indicated by the first "Install TFIM specific instance of TAMeB (available for reuse)" option 216, the required functionality will be provided by a new instance of this component. In addition to having the option of selecting the new instance as being available for re-use by other products, the administrator may also be given the option of selecting the installation of a new instance that is not available for component re-use in other situations, as indicated by the second "Install TFIM specific instance of TAMeB (not available for reuse)" option 217. As will be appreciated, this option may be grayed out and not available as a selectable option if this is not a sensible option. For example, it would not make sense to install TAMeB so that no one else can use since it would not actually support enabling of TFIM. Whichever new installation instance is selected, the installation process for TFIM builds and sends a request to the install proxy service 230 (e.g., over the Internet 220 or through a local, on-machine communication) which initiates the TAMeB installation process, using the information provided from the TFIM invocation of the install proxy, and any additional, TAMeB information that is collected from the user as part of the install proxy guided installation of TAMeB. When the installation (and high-level install-related configuration) of the new instance of TAMeB is complete, the install proxy service 230 returns control of the overall TFIM installation process to the TFIM installer, at which point, any TFIM specific installation resulting from TAMeB's successful installation is completed. For example, if TFIM depends on TAMeB's installation of a reverse proxy server, the successful installation of the TAMeB reverse proxy server results in the (attempt by) TFIM installer being able to configure the TFIM installation for use of this newly installed component. As will be appreciated, to allow for subsequent configuration of TFIM, the install proxy may handle the local caching/storage of the necessary TAMeB information for use as part of the TFIM configuration during the TFIM install/config, which will be undertaken once all required pre-requisite components have been appropriately installed and configured. Thus, the successful installation of TAMeB allows the TFIM installer to re-use information such as the hostname and available ACLs (Access Control Lists) on TAMeB as part of the TFIM installation as well as specify TFIM-specific information for the TAMeB configuration, such as a TFIM-specific junction.

By using the install proxy service 230 to invoke the associated component installation process 250, the Product A installation process does not need to know anything about how the associated component is installed. However, if any input from the user/client computer 210 is required for installation of an associated component, the install proxy service 230 may provide a handle to the GUI of the client computer 210 which identifies any information required during installation of the associated component. To reduce the amount of information required from the user during installation of the associated component, the install proxy service 230 may provide default data for Product A components (such as endpoints, host names, etc) that was obtained from the initial Product A installation process at the client computer 210. In addition or in the alternative, default data may also be collected as part of the installation/configuration of the component (Component Z) and used by the install proxy to default information during the Product A installation. The use of default data not only reduces the amount of data entry required by the user, but also improves consistency between product installations. Once installation of the associated component is complete, control (and status information) is returned to the install proxy service 230 which acts on the status as required (e.g., by indicating success, failure—abort, retry, etc.) and returns control to the Product A installation process at the client computer 210.

If the "Reuse an already deployed instance of TAMeB" option 218 is selected from the TFIM installation screen, the installation process for TFIM builds and sends a request to the install proxy service 230 (e.g., over the Internet 220) to find a provider option for a previously deployed instance of the TAMeB reverse proxy. The user will then be presented with a list of possible component instances available for re-use. Once a suitable component has been selected, no additional processing may be required, or alternatively, some additional processing may be required for the install proxy to collect the component's configuration information for use by the install proxy in downstream product installation processing. At this point or subsequently, it may also be required that the user provide additional information to ensure that the component is additionally configured for use by the product, for example, by configuring a schema extension for LDAP to support the information required to support the product.

In selected embodiments, the install proxy service 230 processes provider requests from the client computer 210 to identify any provider options that are available to provide this required functionality. In the depicted example, this may be implemented by querying a change/configuration management database (CCMDB) 232 which functions as a repository of information identifying all known instances of any component(s) deployed in the distributed data processing system in response to selection of "re-use an existing product" 218. In response to the query, the CCMDB 232 returns a listing of any previously installed components in the distributed data processing system that provide the required functionality.

If no suitable instances of TAMeB are found (either there are no previously installed instances of TAMeB or all previously installed instances of TAMeB are marked as "not allowable for re-use"), the install proxy service 230 may go back to the user/client computer 210 with a "no suitable instances of TAMeB" message and re-prompt the user with the options 236 on the installation screen 234 for "Install TFIM specific instance of TAMeB," including a re-prompt for the installation option for this component to be available for re-use or is not available for re-use. Whichever installation option is selected for TAMeB, it is contemplated that the TAMeB installation process may need to interact with the user for additional installation or configuration information, although this is not necessarily required.

On the other hand, the user can be provided the option in the installation screen 234 to select the "Install new instance of TAMeB, suitable for re-use" option 238, in which case the install proxy service 230 installs a new re-useable instance of TAMeB to provide the required functionality.

Though not shown, it will be appreciated that, at any point in the overall installation process, the user will be provided the option of "canceling" the overall installation of TFIM. Such a cancel option may be presented as an option in the TFIM installation screen(s) or during the proxy-brokered component installation screens. If the administrator selects the cancellation of install during the install proxy brokered processing of pre-requisite components, the proxy broker may ensure that the component is backed out as appropriate and the control will return to the TFIM installer, at which point the user may be once again prompted to continue or cancel, thus allowing for the granularity of control to be applied to the cancellation of the installation of a particular component, or to the cancellation of the product (and all associated components that have been installed by the installation proxy as part of the overall product/component installation process). If the request to cancel is made from within the overall TFIM installer, the overall TFIM installation will be cancelled. At any point, the cancellation of the installation of TFIM or a TFIM dependent component should cause the appropriate uninstall of newly installed components. In the event that a component that is being re-used is part of the process, any necessary configuration (such as assignment of ports from an app server instance) would be unconfigured, but the previously existing component would NOT be uninstalled. However, a new TFIM specific component could be completely uninstalled.

As described herein, a component function that is required by a product can be provided by an external component without (re)installing a new instance of that component. In selected embodiments, this is accomplished when a user selects an external component by invoking an install proxy service that uses an existing (already installed) component installation process to provide the required component function instead of using the product's installation process. An example of the interplay between Product A's installation process, the install proxy service, and one or more external component installation processes is now provided with reference to FIGS. 3 and 4.

Figure 3:
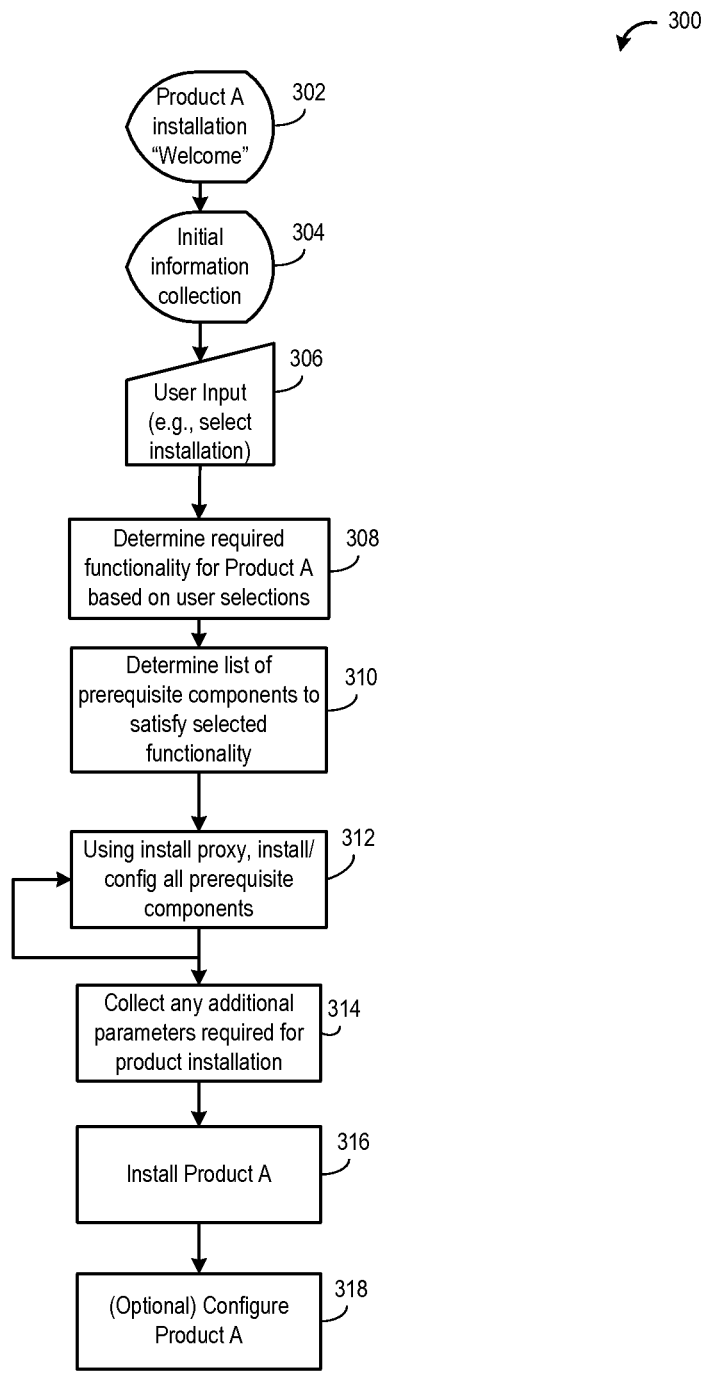
FIG. 3 depicts an example processing flow for installing a software product.

In particular, FIG. 3 depicts an example processing flow 300 for installing a software product (Product A). With reference to step A, the installation process for Product A begins at step 302 (e.g., with a "Welcome" message for Product A installation). At this point, some initial information for the Product installation is collected (step 304), such as by displaying an installation screen which prompts the user to select an installation type (e.g., express or custom). For example, initial choices are often "express" (common pattern of deployed functionality, which further may trigger the installation of all of the required pre-requisite components so that no re-use of existing components is supported and minimal additional user interaction is required) or "custom" (user selected functionality from a list of available product functions). The selected installation option is processed (step 306) to determine the required functionality for the product (step 308) and a list of prerequisite component(s) (e.g., sub-components and/or component functions) needed to be installed in order to satisfy the selected functionality are identified (step 310). As used herein, a "component" refers to software or code that is used to implement a function, where the software or code may or may not be stand-alone product in its own right. For purposes of this illustration where the product is an enterprise software product (such as TFIM), an example of a required prerequisite component is an application server (app server), such as WebSphere Application Server (WAS), or a Tivoli Directory Server (TDS) LDAP directory instance.

Based on the determination at step 310, the required prerequisite components are installed and configured (step 312). As will be appreciated, the installation might be conducted for each prerequisite component one at a time by using the prerequisite component's specific process to present each prerequisite component and its options to the administrator. However, this approach can create complexity in requiring administrator input for each prerequisite component, including administrator knowledge about what components are required and in what order. To simplify and streamline the install/config process, an install proxy can be used to implement an inline process for installing and configuring the prerequisite components (step 312). With this approach, the install proxy builds a list of possible re-usable installations of prerequisite components with one or more data store accesses (e.g., to a CCMDB), such as by identifying potential instances of a deployed, installed component that is available for re-use. In selected embodiments, the install proxy service builds the list by obtaining a first component from the list of required prerequisite components from the Product A installation process, and comparing the first list to a second list of deployed, installed components that is obtained from the CCMDB. A provider option list is then built which associates each of the required prerequisite components on the first list with one or more associated provider options for providing the required prerequisite component. For example, the provider option list may include the WAS component as a required prerequisite component and an associated list of provider options specifying where one or more instances of the installed WAS component are deployed and available. Once the list is built, the install proxy presents the list to the administrator to select an install/config option, and then performs the install/config based on the administrator's selection. The process continues until all of the prerequisite components are installed (as indicated by the feedback loop for step 312). By using the install proxy service to collect all necessary (additional) information for prerequisite component as part of the install/config for that component, this allows a first prerequisite component early in the list to be re-used to provide functionality required by a prerequisite component later in the list. This also allows for the install proxy to keep a history of installation parameters for use by later components in the overall pre-requisite component installation process. Once the prerequisite components are installed and configured, additional parameters that are required for installation of Product A are collected (step 314). In selected embodiments, local information (hostnames, endpoints, etc.) may have been stored by the install proxy processing during the component installation/configuration and provided to the Product A installation process as default parameter inputs values so that parameters do not have to be re-defined by the administrator (note that this also cuts down on errors due to the administrator incorrectly identifying configuration parameters used for the component installation when re-providing this information for the Product A installation). Once the required parameter information is collected, the installation of Product A may be initiated (step 316). Once Product A itself is successfully installed, any additional configuration processing for Product A is (optionally) performed (step 318).

Figure 4A:
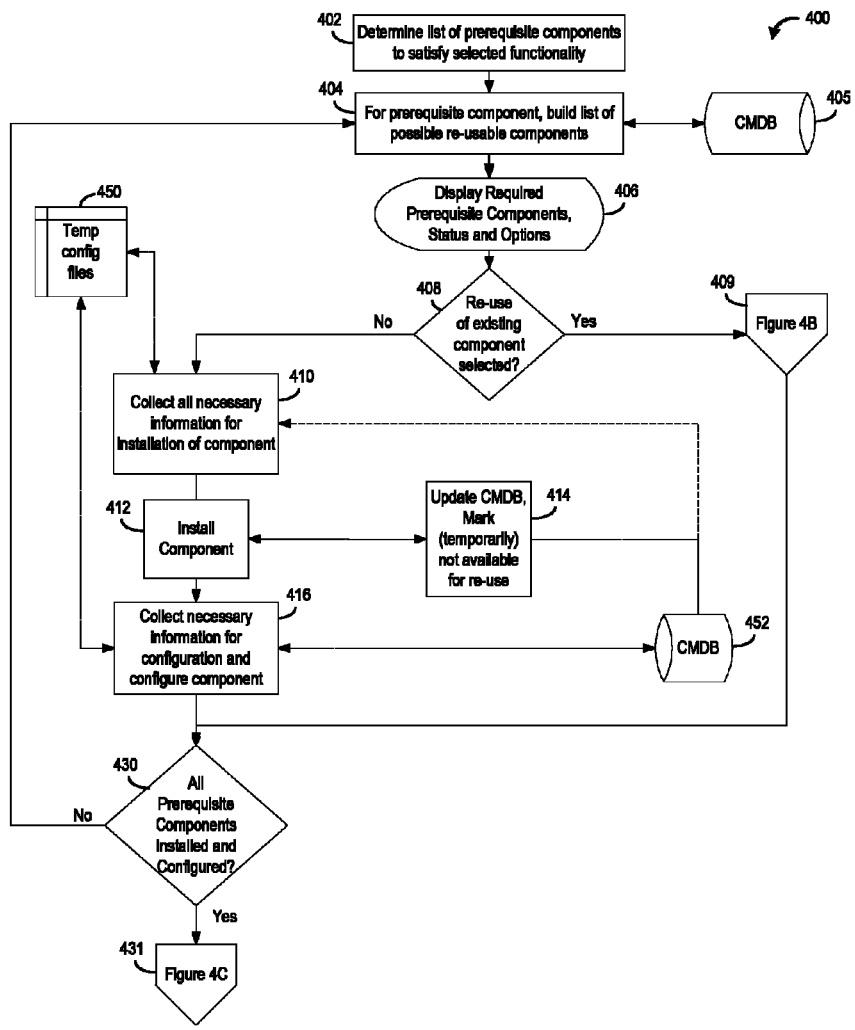
FIGS. 4A-4C depict an example processing flow of an installation proxy service which is used to install and configure the prerequisite components required for a software component.
Figure 4B:
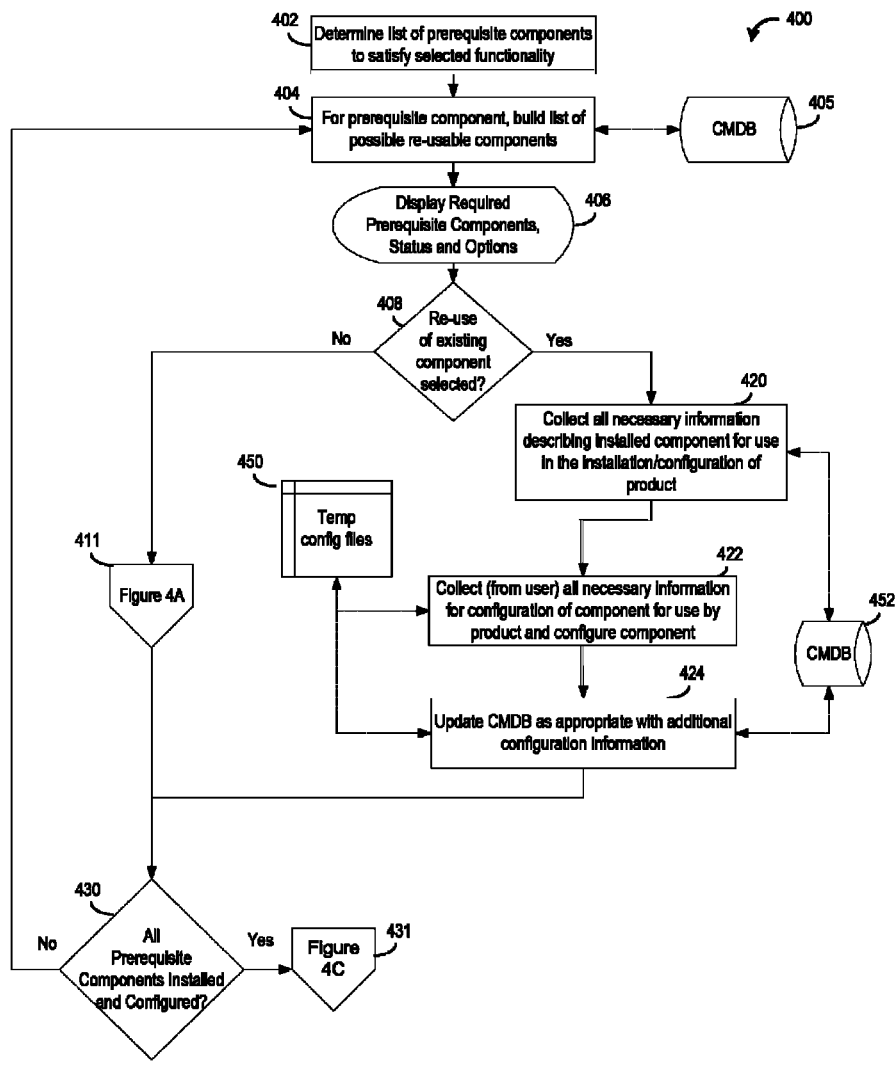
Figure 4C:
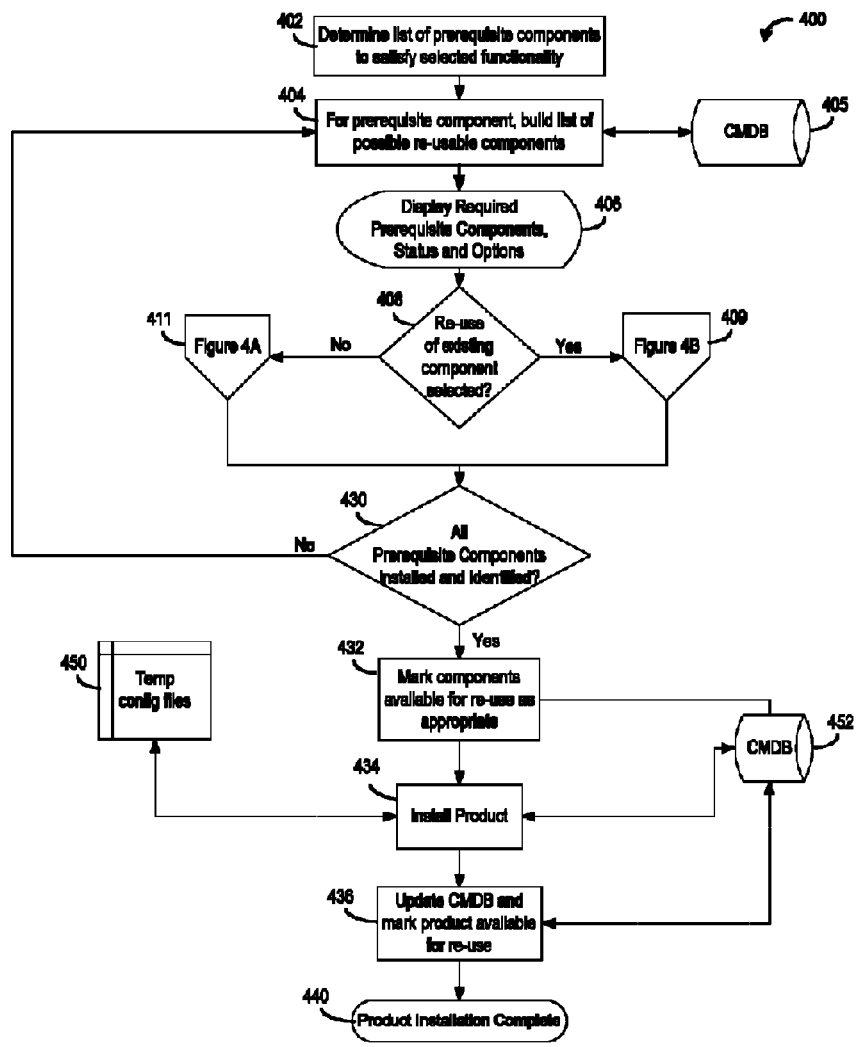

FIGS. 4A, 4B and 4C depict an example processing flow of an installation proxy service which is used to (successfully) install and configure the prerequisite components required for the selected functionality of a product (e.g., Product A), where FIG. 4A illustrates a new installation flow, while FIG. 4B illustrates the re-use of an existing component. After determining a list of the prerequisite components that are needed to satisfy the selected functionality (step 402), the installation proxy service evaluates a first prerequisite component by identifying the potential providers of the required prerequisite components (step 404), such as by identifying potential instances of one or more deployed, installed components that are available for re-use. In selected embodiments, the installation proxy service evaluates potential providers by accessing a configuration management database (CMDB) (step 405) which functions as a repository of information identifying all known instances of any component(s) deployed in the distributed data processing system as well as meta-data that describes these known component instances.

A provider option list is then built or obtained which associates a prerequisite component with one or more associated provider options for providing the required prerequisite component. For example, the provider option list for a selected component may reflect the fact that there are no available provider options, or may include one or more provider options for the selected component. The provider option list is presented to the administrator, along with status information and selection options (step 406). As presented, the administrator is given the option of choosing to re-use a previously deployed instance of the prerequisite component (if available) or to perform a new installation (e.g., from "scratch"), though in the depicted example, the component is selected as part of determining whether to re-use or install a new component (in contrast to the example depicted in FIG. 3 which shows the process of selecting possible components after a determination of new/re-use is made)

If there are no provider options available or selected by the administrator for the selected component (negative outcome to decision 408), then the processing must include the installation of a new instance of the required component, as illustrated in FIG. 4A. The installation proxy service collects all necessary information for the installation of the prerequisite component, step 410, such as the host name on which the component is to be installed, typically through a user interaction where the install proxy will broker the collection of required parameters from the user. In this way, the install proxy can itself govern the information collection or can invoke the component install process which will then handle the information gathering (step 412). The collected information may be stored in memory or a temporary file (450) or in a "permanent" data store, such as the CMDB 452. At this point, the installation of the selected software component may occur "under the covers" in the sense that user is not provided with information about the selected component installation process.

To this end, the installation screen may only display "Please Wait" during installation of the selected component. Once the installation is complete (and successful) the install proxy may update the CMDB information for this newly installed component, (step 414). When updating the CMDB with the installation data as part of the installation, it is possible that the component will be temporarily marked with a default of "not available for re-use" until the software product installation is complete (thus preventing the premature re-use of the component by other products, for example, a different software product from attempting to re-use this component instance, which may in turn be backed out should the first software product's installation be cancelled by the administrator). When the installation of the selected software component is completed, control is returned to the installation proxy service which can collect the information required for the component's run-time configuration (step 416) and then configure the component as appropriate, for example by creating a Directory Information Tree, DIT, within an LDAP instance or creating a server instance within an Application Server. Once the deployment of this component is completed, the installation proxy server determines if there are any remaining required pre-requisite components, step 430. If there are, the installation proxy begins the processing again for the next required component, step 404. If all of the required components have been installed, the processing continues, as described with FIG. 4C, step 431.

As illustrated in FIG. 4B, if there are one or more provider options available for the selected component, then the processing may proceed to re-use an existing prerequisite component (affirmative outcome to decision 408, wherein the selected component is identified as part of the affirmative decision). If the user chooses to re-use an existing prerequisite component, the installation process retrieves the necessary information to be used as parameters in the product installation as shown at 420 in FIG. 4B (409), such as by retrieving parameter information (e.g., the prerequisite component's machine name, ports to be used to enable product communication with the prerequisite component) from a data store (e.g., CMDB 452). As illustrated with the example of FIG. 4B, when the user selects one of the previously installed components (affirmative outcome of decision 408), the installation proxy service configuration interacts with the user as required (step 422) to retrieve any additional information required to specialize (run-time configure) this existing component for use by Product A. The process may provide a handle to the component GUI identifying any information required by the selected software component, and may also provide default data values for the selected software component provider. Optionally, the installation proxy may update the metadata about this (re-used) component in CMDB (step 424).

When the selected software component provider is completed with its installation/configuration, it will return control to the installation proxy service. At this point, the installation proxy service may provide a status indication to indicate whether the installation or (run-time) configuration was successful. Although not shown in FIG. 4A or 4B, it will be appreciated that should the installation/configuration of the required component not successfully complete, this can be indicated as part of the decision of step 430 and used by the installation proxy server to re-attempt the installation/configuration of the required component on the next iteration begun with step 404

The foregoing process is repeated for each of the prerequisite components on the list until all of the prerequisite components are installed and/or configured, as indicated by the feedback loop from decision 430 to step 404 in both FIGS. 4A and 4B. If not all of the required prerequisite components have been installed (negative outcome from decision 432), the next required prerequisite component on the list retrieved (step 404) and displayed along with its associated provider option list (step 406), and the process continues. Thus the pre-requisite components for a product installation may be provided by a combination of newly installed and re-used components. Once all of the prerequisite components are installed and configured (affirmative outcome to decision 430), the installation proxy service may mark any newly-installed components as available for re-use as applicable, step 432 and returns control to the Product A installation process, FIG. 4C. The Product A installation process may collect temporarily stored information, step 434, (from temporary store 450 or from a data store such as CMDB, 452) for use as default information required during the Product A installation. Product A is installed, step 434, and the appropriate data store (e.g., CMDB 452) is updated with information about the Product A installation, step 436. At this point, given the successful installation of Product A, the overall product A installation is complete, step 440.

FIGS. 5-20 show an example sequence of installation screens which may be enabled by the install proxy and displayed in the course of installing required components in an example software product, where software product has a dependency on one or more prerequisite components. In the depicted example, the example software product is the TFIM product, and the prerequisite components are WAS and Tivoli Access Manager for eBusiness (TAMeb). In this example, it is assumed that the installation process for the software product (TFIM) identifies a set of prerequisite components that are required for a selected functionality for the software product. The identified set of prerequisite components includes at least any prerequisite components that are common to any/all functionality, plus additional functionality-specific prerequisite components.

Figure 5:
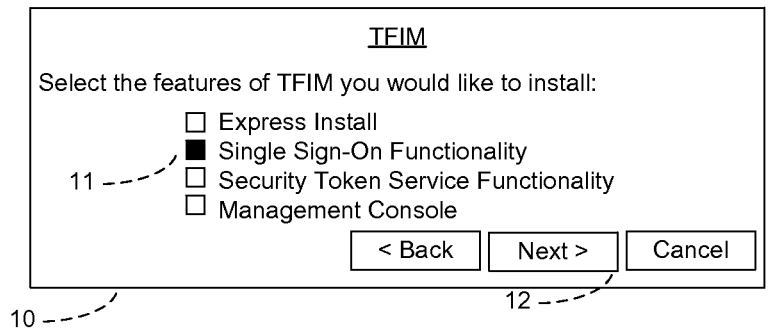
Figure 6:
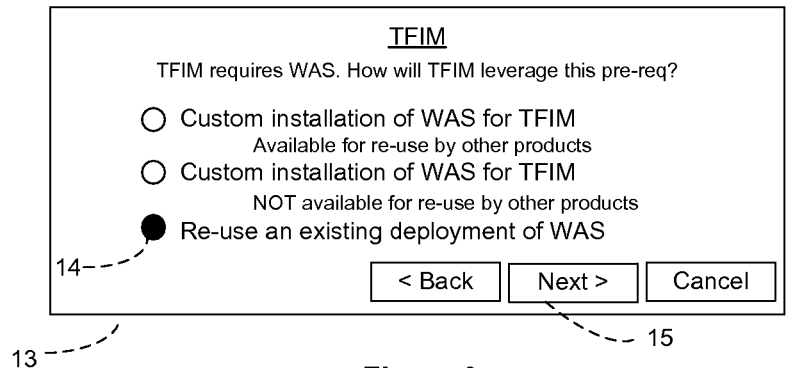

To this end, the first step in the installation of a product (e.g., TFIM) is the selection of the initial, high level TFIM features to install with TFIM, as shown in the installation screen 10 in FIG. 5. As illustrated in FIG. 5, an "Express Install" option is provided, along with a number of additional features that are available for selection, such as the Federated Single Sign-On Functionality, Security Token Service Functionality, and the Management Console feature. In the installation screen 10, the install/administrator has selected the Federated Single Sign-On functionality, as indicated with reference numeral 11. When the desired functionality has been selected, the administrator selects the "Next" option 12 to start the overall process. At this point, the product installation processing will determine the prerequisite components that are required based on the known "base" prerequisites (e.g., J2EE container requirements provided by WebSphere Application Server, WAS) and the additional prerequisite components that are specific to the selected functionality (e.g., LDAP and TAMeB requirements).

Where the product requires certain prerequisite components, regardless of what functionality is selected, these base prerequisite components are dealt with first by having the product installation process present the install/administrator with an option screen 13 which lists the basic options, as shown in FIG. 6. For example, if an application server (e.g., WAS) is a base requirement for installing the software product (TFIM), the install process or the installation proxy provides the administrator with an option screen 13 with the option of a new (custom) install of the WAS component or the ability to re-use an existing WAS component. As depicted in the option screen 13, the new/custom installation option is shown as being set up as available for re-use, or for this product only. Depending on the selection here, this parameter will be part of the information entered into CMDB to describe this component and thus its availability for re-use in other product deployment scenarios. If the user selects the option to re-use an existing WAS deployment (as indicated with reference numeral 14) and selects "Next" 15, the TFIM installation process will invoke the installation proxy with a request to determine the list of suitable WAS instances that may be re-used by the TFIM product. The request to the installation proxy may be referred to as the query functionality of the installation proxy, and may be implemented by searching against a data store (e.g., a CMDB) to find the possible options for re-use of the required component.

Figure 7:
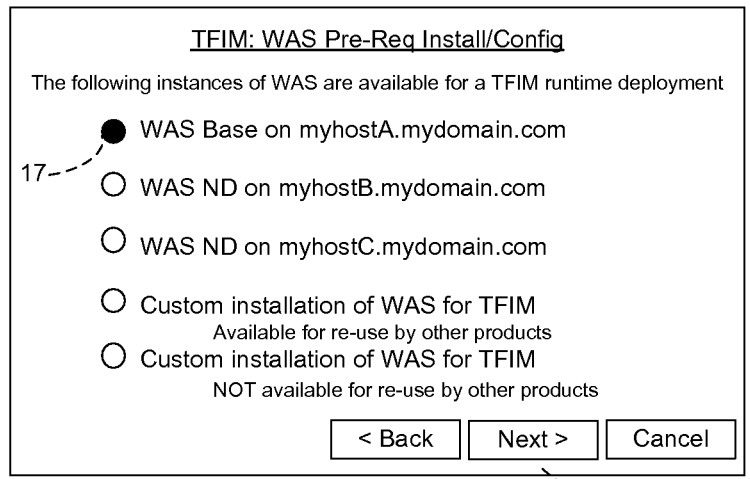

The results of this query search are presented in the results screen 16, as shown in FIG. 7. As depicted, the results screen 16 identifies three installations of WAS as possible re-use candidates. In addition, the results screen 16 also includes a new/custom installation option in case the install/administrator does not like any of the re-use options. If the new/custom installation option was not available, the user would use the "Back" button to back to the previous screen to select a new/custom installation option. In the depicted screen 16, the install/administrator selects an existing WAS Base installation on myhostA.mydomain.com as indicated with reference numeral 17 and then selects "Next" 18.

The selection of the WAS Base option prompts the installation proxy to collect the required information (e.g., machine names, port numbers, administrator names, etc.) that defines and/or identifies this component and will make this information available to the TFIM installation process so that this information need not be prompted for but can be provided as default values. The prompt may take the form of a parameter screen 19 which lists the parameter information for the selected instance of WAS, as shown in FIG. 8. Though the parameter screen 19 is actually generated by the install proxy, it may be "branded" to look like it is still the TFIM installer itself, and is used to collect the known configuration information required to install WAS. The listed parameters on the parameter screen 19 returned by the installation proxy and/or CMDB define the selected installation of WAS, and include information such as the WAS administrator's user ID and the WAS hostname. As indicated with the gray colored data fields, these values cannot be changed as part of the TFIM installation. However, as indicated with the white colored data fields, the TFIM installation administrator is prompted for the WAS administrator password 20, without which the configuration of TFIM against this installed instance of WAS will not succeed. There is also the option to redefine the (automatically selected next available) ports in the data fields 21, 22 if the predefined values are not appropriate. These values can be changed by the TFIM installation administrator, provided they do not conflict with any previously-assigned ports. At this point, the install/administrator has the option of going "Back" 23 upon determining that the selected instance of WAS is not suitable after all. Once the appropriate information has been reviewed and provided, the configuration of the already installed instance of WAS for use with TFIM is initiated by the install proxy in response to the "Next" option 24.

Once the configuration of the WAS component for use by TFIM is completed, a status details screen 25 is displayed to provide the details of the install, as shown in FIG. 9. At this point, the options provided to the administrator are to continue by selecting "Next" 26, or to select "Cancel" 27. At this point, there is no "Back" option provided as the undoing of the installation/configuration is typically not supported through any means other than the cancellation of the installation. The selection of the "Cancel" option cancels or undoes the installation of WAS, but does not necessarily cancel/undo the entire installation. Thus, it is possible to partially undo a component install, even though there is no "Back" option.

Once the installation/configuration of the WAS component is completed, the next step is to return control to the TFIM installation process to continue with the installation by moving to the next prerequisite component, TAMeB. In this next step, the TFIM installation process will prompt the install/administrator with a selection screen 28 providing the options for the use of the TAMeB prerequisite component for this installation, as shown in FIG. 10. The selection screen 28 can be generated either by the TFIM installer or by the install proxy, in which case it may be "branded" to look like it is still the TFIM installer. With the selection screen 28, the user selects a custom installation of TAMeB to be marked for re-use by other products as necessary, as indicated with reference number 29. As indicated with the gray colored selection option 30, the user is not able to choose to install a new instance of TAMeB such that it cannot be re-used, as this is contrary to the way in which TFIM needs TAMeB to be used by the rest of the environment. Once the user has selected the appropriate option for the TAMeB component, the user can select "Next" 31 which will cause the TFIM installation process to invoke the installation proxy for the installation of TAMeB. While there is no "Back" option provided in the selection screen 28 (as this would simply return to the status details of the WAS install), the user can choose the "Cancel" option 32 to allow the cancellation of this step of the installation process. A cancellation at this point could be used to invoke the option to uninstall a specifically installed WAS.

Figure 11:
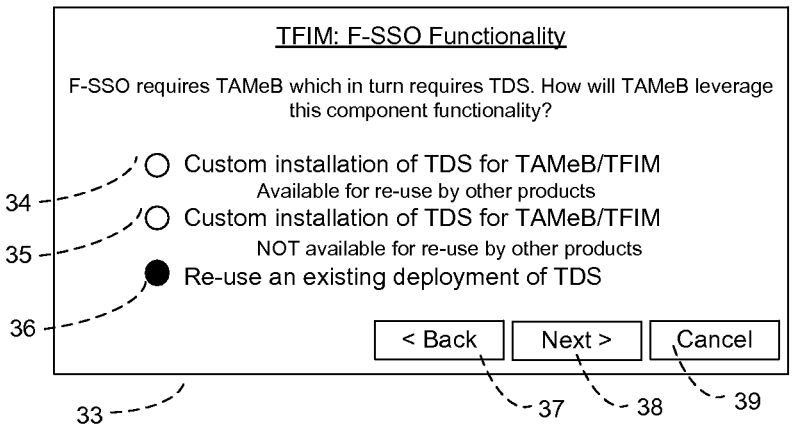

There may be cases where a component being installed itself requires a prerequisite component that must be installed. For example, when the installation proxy uses the information provided by the TFIM installation process to attempt the installation of TAMeB, the installation proxy determines that TAMeB in turn has a pre-requisite TDS component. To meet this requirement, the installation proxy now re-does the prerequisite component processing for the TDS functionality by first providing the install/administrator with the options screen 33 to select how this TAMeB installation will use TDS. As depicted, the install/administrator has the option of selecting re-use of a TDS instance, as indicated at reference number 36. Alternatively, the install/administrator may not have the re-use option, or may instead choose to have a simplified installation of the TDS component performed where a stand-alone instance of TDS is installed as part of the TAMeB installation. That is, the installation proxy can be configured to be flexible enough to handle this type of situation. In FIG. 11, the install/administrator selects the option 36 to re-use a TDS installation and selects to continue processing by clicking "Next" 38.

Figure 12:
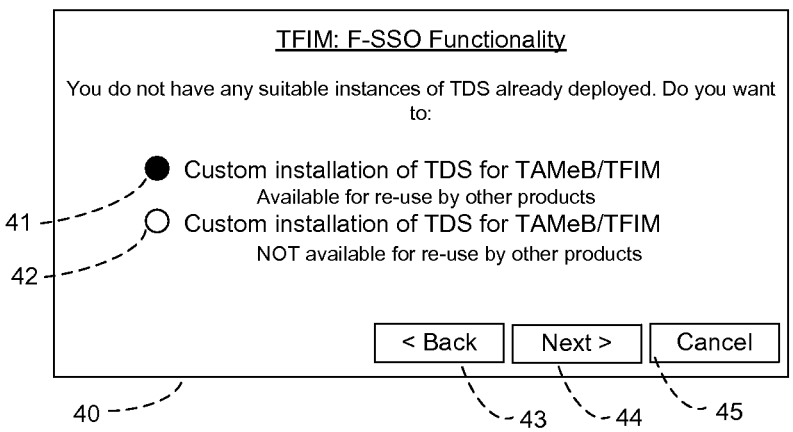

As indicated with the results screen 40 shown in FIG. 12, in response to the selection of the re-use option, the installation proxy may determine that there are no suitable instances of TDS available for re-use based on its search of CMDB. In this case, the results screen 40 prompts the install/administrator to choose a new version of the TDS component, but provides the choice of making this a TFIM-specific installation or allowing it for re-use by other products. If, as shown at reference numeral 41 in FIG. 12, a re-usable new installation of TDS is selected, the processing is initiated by selecting "Next" 44.

Figure 13:
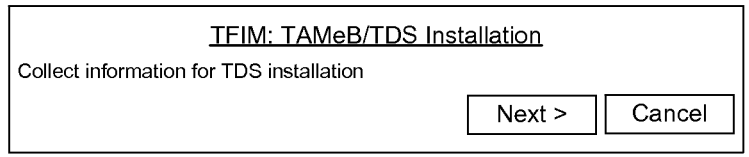
Figure 14:
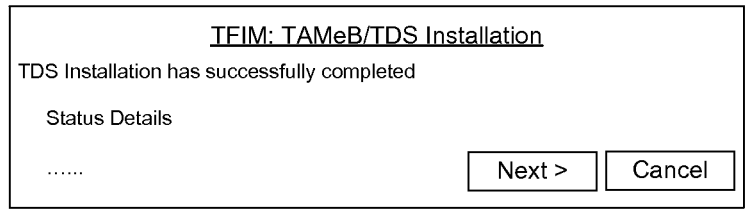

In response, the installation proxy collects the information required to perform a custom installation of the TDS component, at which point a status screen 46 may be displayed, as shown in FIG. 13. And upon successful installation of the TDS component, a status screen 47 is displayed, as shown in FIG. 14.

Figure 15:
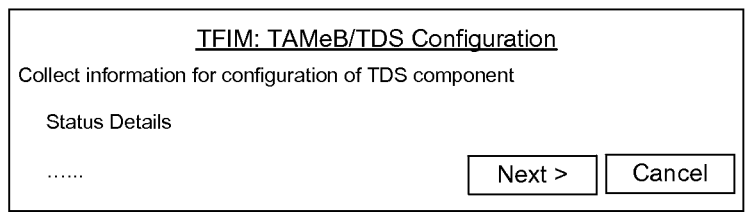
Figure 16:
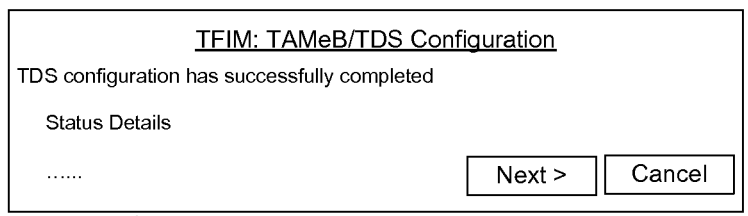
Figure 17:
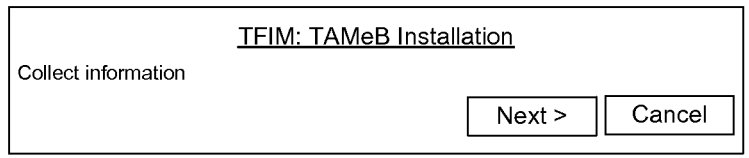
Figure 18:
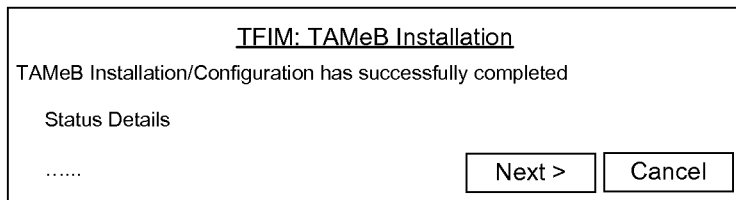

Once the installation of the TDS component is complete, the installation proxy will collect information for the configuration of the TDS component, at which point a status screen 48 may be displayed, as shown in FIG. 15. The required configuration information collected by the installation proxy may then be used to invoke a CLI/script process to configure the TDS component for use by TFIM product. In accordance with selected embodiments, any information that was used to install/configure the TDS component that may be required as part of the TFIM installation (e.g., a machine name/location, ports, schema updates, etc.) may be stored by the installation proxy and provided to the product installer as parameters to be used in the product installation process. Upon successful configuration of the TDS component, a status screen 49 is displayed, as shown in FIG. 16. After the TDS component is installed, installation control is returned to the TAMeB installation within the install proxy, which collects the TAMeB installation information (as shown by the status screen 50 shown in FIG. 17) and then provides a status report once the TAMeB installation is performed (as shown by the status screen 51 shown in FIG. 18).

Figure 19:
Figure 20:
Figure 21:
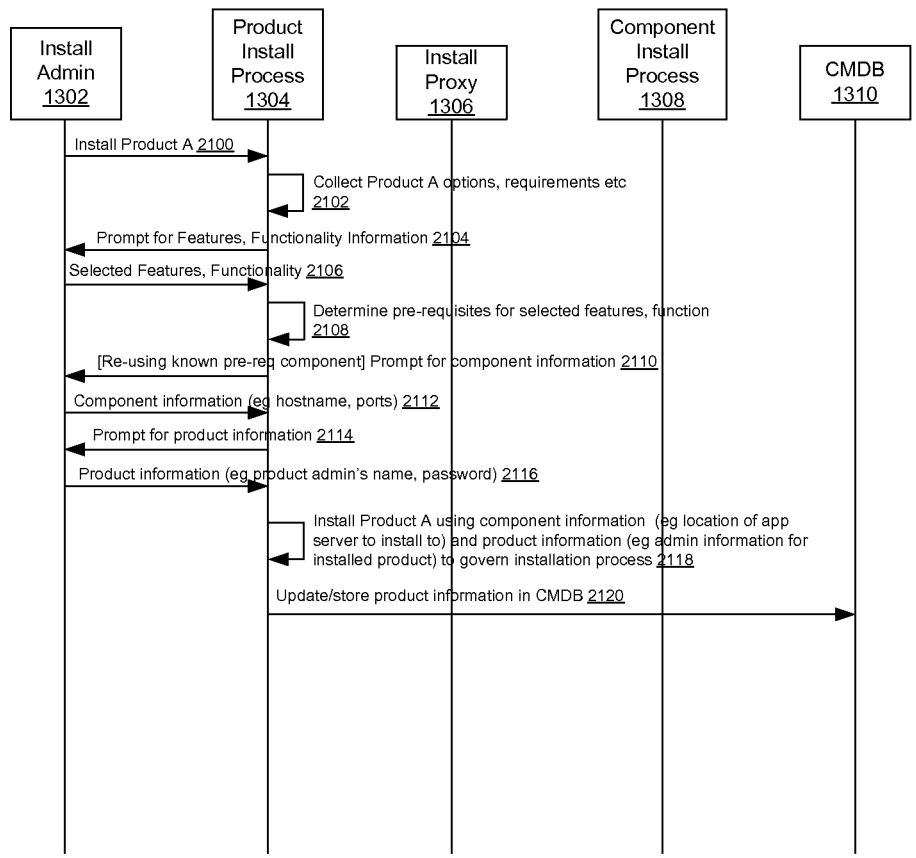
FIGS. 21-26 depict in flow form various example sequences for installing a product to show the functional divisions for using, re-using and/or newly installing the required components for the product.

At the point when all of the prerequisite components for the TFIM product have been successfully identified (where identification process may have required installation and configuration), it is time for the installation of the "main" product, and processing control is returned to TFIM installation process which continues with TFIM specific information collection (as shown by the status screen 52 shown in FIG. 19). Typically, the installation of a product requires lots of inputs used to identify parameters, where these parameters in turn identify the pre-requisite components and the characteristics of these components necessary for the TFIM installation process. By using the installation proxy service, much of this information has already been determined as part of the prerequisite component processing. Typically, the only information that would be required of the administrator at this point is password information (such as an app server administrator password required to install the product runtime at a given app server container). In general, any other (non-password) information that is required for the software product installation process that has already been identified as part of the prerequisite component processing will be provided to the installation process so that the administrator does not have to re-enter this information. Once the TFIM installation is completed, the install proxy provides the overall TFIM installation status (as shown by the status screen 53 shown in FIG. 20), and the only option is to select "Finish." While a "Cancel" option could be provided, it is typically considered to be best practice at this point to require the user to initiate a specific "UNINSTALL" process to remove the product and its components, where the uninstall process will follow the same processing as described for the installation, including that shared components are not uninstalled and single-use components that are deployed as part of the software product installation process are uninstalled at this time.

As seen from the foregoing, the install proxy service is involved to assist the main product's (e.g., Product A) installation process with installing and configuring any required components all of the prerequisite components are installed and configured. In selected embodiments, the main product's installation process is facilitated by having the installation proxy service maintain information from the installation process in a cache memory or some other type of historical record. In this way, the user need not be prompted to provide the information defining the prerequisite components because such choices have already been determined by the components that have been identified and/or selected through the installation process, and any required configuration data is carried forward from the installation process. When the installation and configuration of the prerequisite components is completed, the proxy service returns control to the main product's installation process, together with relevant parameter and/or status information. This loosely coupled approach to installation and configuration allows the user to have what appears to be a seamless install/config approach, even though multiple independent install/config processes may have been invoked by the install/config proxy service.

By using the installation/configuration proxy service, a software program may be installed in a way that leverages existing deployments of component modules, thereby reducing the complexity that would otherwise be required if every component module had to be installed during installation of the software program. In this way, constituent components are efficiently installed within a product installation, and need not be deployed in a product across a system, and there is no need to build and maintain all of the installation/configuration code for each individual component into a single process, as is the case with an integrated approach. And by maintaining a collection of information identifying all known instances of any component(s) deployed in the distributed data processing system, the actual IT environment in which the software program operates is captured, so that components within the IT environment can be re-used instead of re-installed for every new product that is installed. The collection of information for all deployed components also allows a level of recovery when prerequisite components are not locally available and are not included within an installation process. For example, by using an installation/configuration proxy service, a product installation service can recover from an installation failure by invoking the proxy installation service, which in turn invokes the installation of the appropriate prerequisite component, instead of requiring that the required prerequisite component be re-installed. In short, the installation/configuration proxy service loosely couples the software product to its constituent modules, which allows for flexibility in installing and configuring software products (including integrating third-party products as prerequisite components) while at the same time providing some isolation between the software products from components and component changes.

FIGS. 21-26 depict in flow form various example sequences for installing a product to show the functional divisions for using, re-using and/or newly installing the required components for the product. Starting first with FIG. 21, there is illustrated an example conventional flow where the install proxy is not used. In this example, the product installation is depicted for the case when all of the required prerequisite components are required to be pre-installed before the installation of Product A is started using the Product A Installation Process 1304. In this scenario, because the Product A Installation process 1304 does not leverage the install proxy 1306, all required components/pre-requisite products must be pre-installed. Beginning with the Installation Administrator 1302 in step 2100, the decision to install a product ("Install Product A") prompts the Product A Installation Process 1304 to collect the initial information for Product A, such as the options, requirements, etc., in step 2102. The Product A Installation Process 1304 then prompts the Installation Administrator 1302 to select the features and functionality to be installed with Product A in step 2104. In response, the Installation Administrator 1302 selects and returns the selected features/functionality to the Product A Installation Process 1304 in step 2106, which then determines what prerequisite components are required for the selected features/functionality in step 1308. Product A Installation Process 1304 assumes/requires that all prerequisite components are already installed and prompts the Installation Administrator 1302 to provide component information (e.g., the hostname, ports, etc.) needed to configure with the product (Product A) for the use of these components in step 2110. In response, in step 2116, the Installation Administrator 1302 returns the requested component information to the Product A Installation Process 1304 as part of the overall information provided by the Installation Administrator 1302 during the Product A installation process in step 2118. Once the overall product installation process is complete, the product install process may then optionally update a CMDB data store in step 2120.

Figure 22:
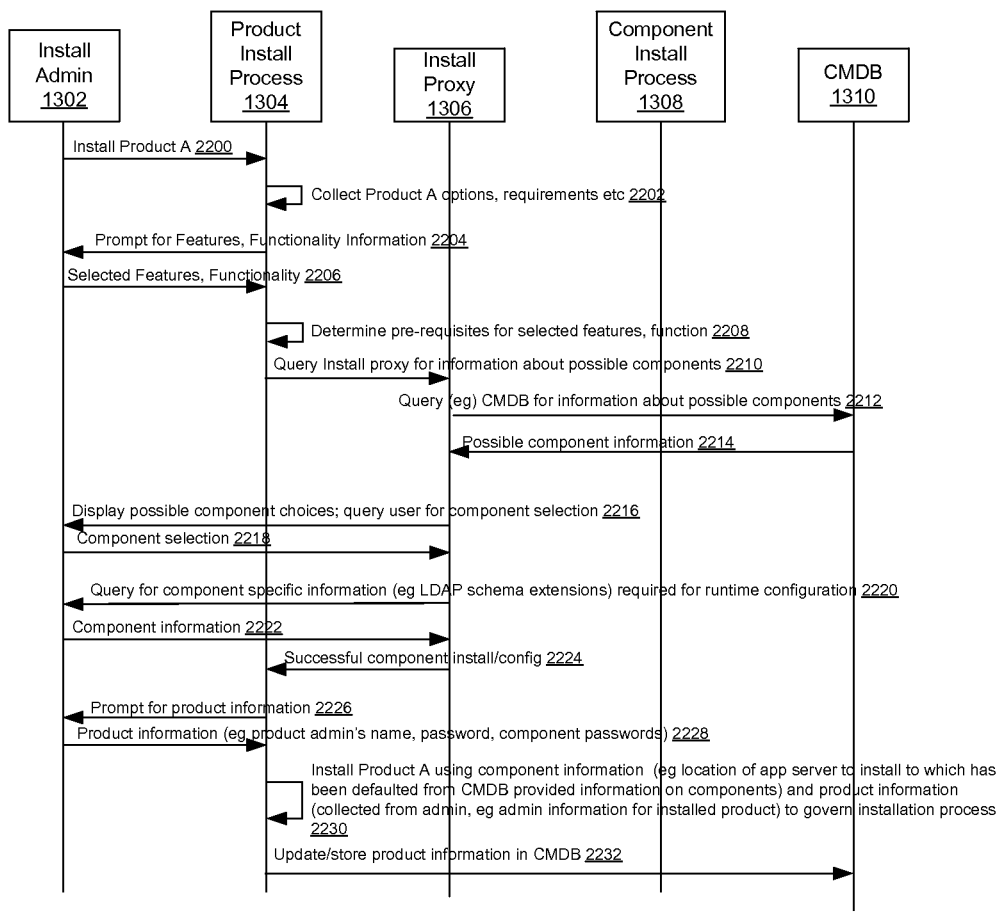

In situations where the Product A Installation Process 1304 is able to leverage the Install Proxy 1306, the requirement that all pre-requisite components be pre-installed may be relaxed. If required prerequisite components are not already installed with Product A, the Install Proxy 1306 may be used to broker a search for existing prerequisite components, such as by accessing a CMDB-like container. The re-use of existing components is illustrated in FIG. 22 with a first example in which the Product A Installation Process 1304 serves to control the installation process. Beginning with the Installation Administrator 1302 deciding to install a product ("Install Product A"), the Installation Administrator 1302 initiates the product installation (step 2200) with the product install process, prompting the Product A Installation Process 1304 to collect the initial information for Product A (such as the options, requirements, etc.), in step 2202. In turn, the Product A Installation Process 1304 then prompts the Installation Administrator 1302 to select the features and functionality to be installed with Product A, in step 2204. In response, the Installation Administrator 1302 returns the selected features/functionality to the Product A Installation Process 1304, in step 2206, which then determines what prerequisite components are required for the selected features/functionality, in step 2208. At this point, the Product A Installation Process 1304 may issue a query to the Install Proxy 1306, in step 2210, to identify any prerequisite components that can be re-used. In this example, the Install Proxy 1306 issues a query to the Configuration Management Database (CMDB) 1310 to find information on any prerequisite components that are available for re-use, in step 2212. The requested information would identify any applicable components that can support the selected product runtime functionality. In response, the CMDB 1310 returns the requested information identifying the components in step 2214, such as the required/relevant application server information (e.g., machine name, admin ports, etc.) for application servers that can be re-used. The Install Proxy 1306 presents the requested component information to the Installation Administrator 1302 (step 2216) which displays a list of choices (optionally based on high level information only) for the user to select one of the components for re-use. Once the Installation Administrator 1302 returns the component selection information in step 2218, selecting the components to be re-used, the Install Proxy 1306 queries the Installation Administrator 1302 for any additional, component-specific information in step 2220, such as confirmation of the communication ports that will allow the product to communicate with the component, having already gathered much of the information about that component required for the product installation from the CMDB parameters. When the component-specific information is returned in step 2222, the Install Proxy 1306 provides an indication of successful component installation/configuration to the Product A Installation Process 1304 at step 2224, and the Product A Installation Process 1304 requests in step 2226, and receives information required for the product installation (e.g., administrator passwords for components and for the product itself) product information (e.g., the administrators name and password) from the Installation Administrator 1302. Based on all of this, the Product A Installation Process 1304 now installs the product against the selected components in step 2230. Once the installation is successfully completed, the product installation process 1306 may invoke the install proxy 1308 in step 2232 with information about the new product install so that the install proxy may ensure that the data store (e.g., CMDB 1310) is up-to-date with new product information as well as additional information about the configured components (shown in FIG. 22) or the product install process 1304 may update this information directly to the data store (e.g., CMDB 1310) directly.

Figure 23:
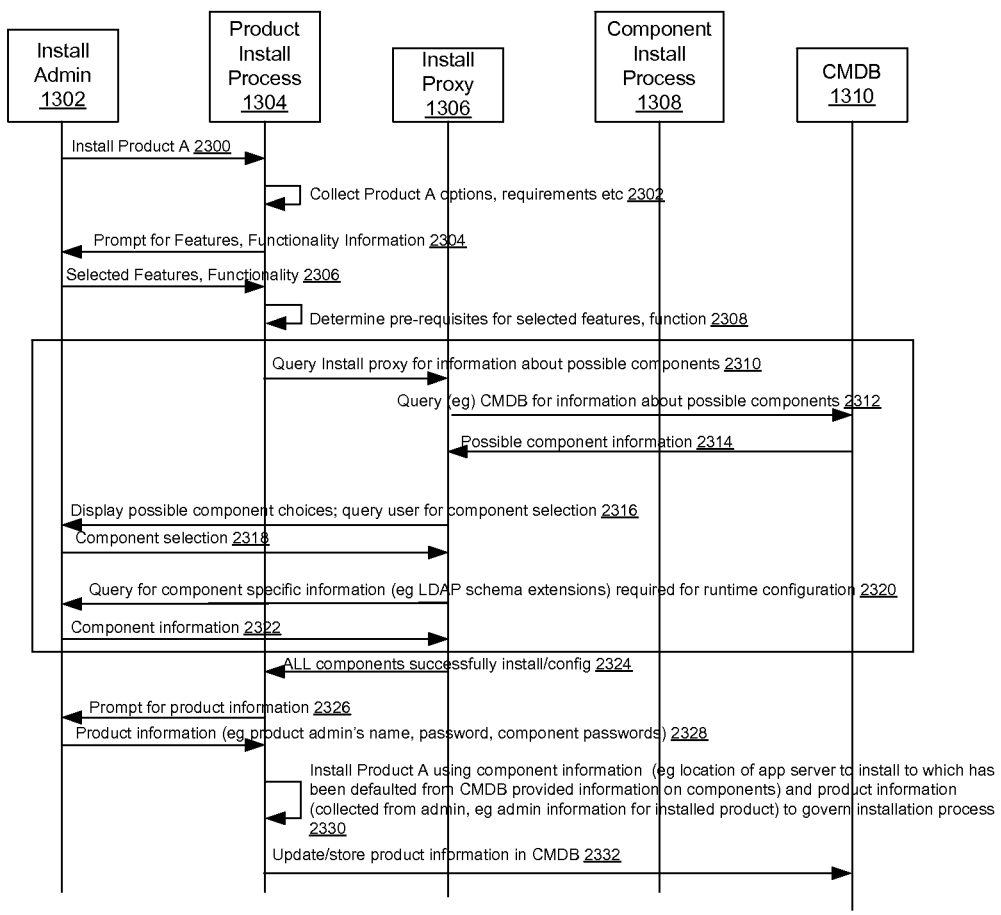

Whereas FIG. 22 illustrates one use of the Install Proxy for the identification and re-use of a single prerequisite component, there are situations where multiple components may need to be considered as part of a single product installation. An example is shown in FIG. 23 which illustrates the use of the Install Proxy 1306 to iteratively identify and select multiple prerequisite components. The process is quite similar to the sequence depicted in FIG. 22, except that the Install Proxy 1306 is invoked multiple times, corresponding to the re-use of multiple existing components. As shown in FIG. 23, the product Install Proxy determines the list of required components, and then uses the Install Proxy 1306 in an iterative manner to iterate through the selection (and possibly installation) of the required components, iterating through steps 2310 to 2322 to accomplish this process. Tying this back to FIGS. 4A and 4B, as part of this processing, the Install Proxy 1306 will typically store the relevant component information for later use as default or defined values during the product installation, steps 2324-2326, and the product installation itself (step 2330). At this point, the Product Install Process 1304 may send the assembled information to the CMDB 1310 so that it is kept current, step 2332.

Figure 24:
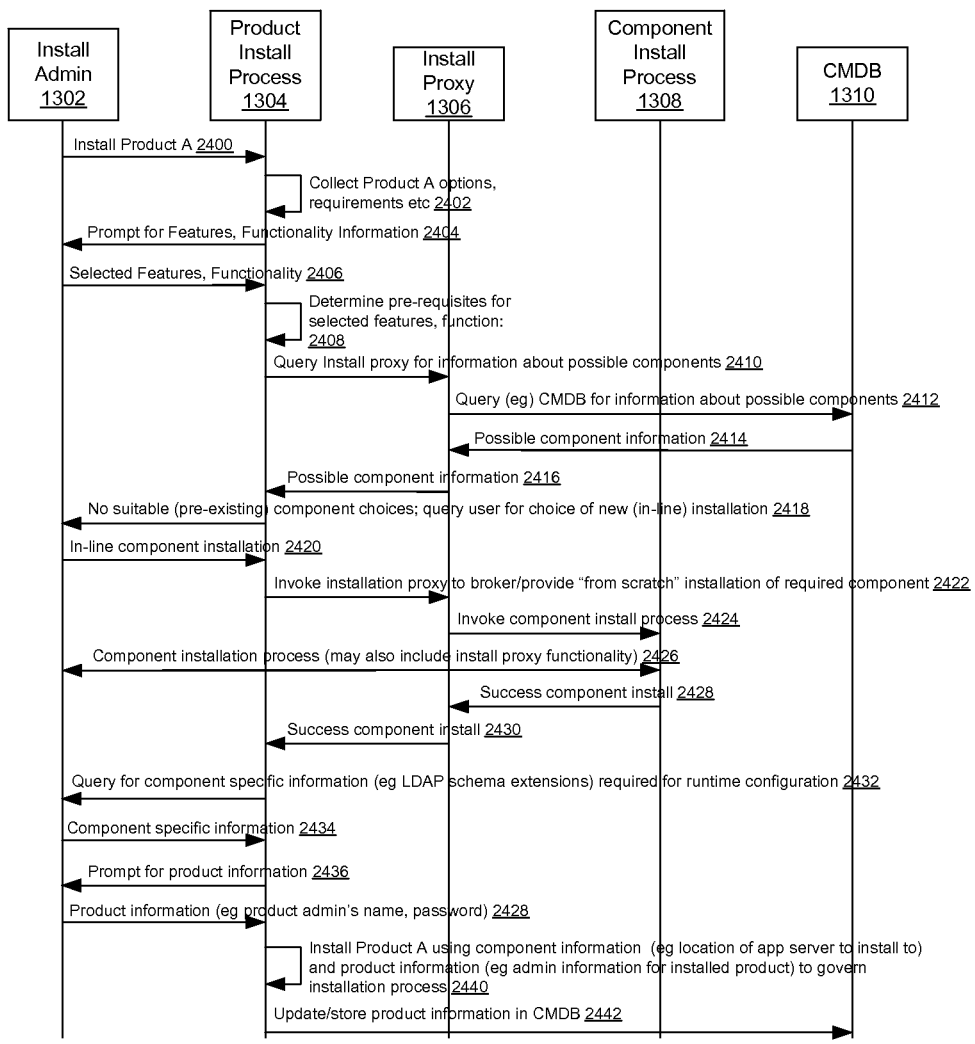

There will also be situations where a brand new installation of a prerequisite component is required. For example, if the Install Proxy 1306 is not able to find a deployed component for re-use, or if the administrator explicitly requests a new instance of a required component in lieu of component re-use, the Install Proxy 1306 may be used to broker a new installation of the required component. A first example such a new installation is illustrated in FIG. 24 in which the Product A Installation Process 1304 serves to control the component installation process. Beginning with the Installation Administrator 1302 deciding to install a product ("Install Product A") in step 2400, the Installation Administrator 1302 prompts the Product A Installation Process 1304 to collect the initial information for Product A (such as the options, requirements, etc.) in step 2402, and then to prompt the Installation Administrator 1302 to select the features and functionality to be installed with Product A in step 2402. In response, the Installation Administrator 1302 returns the selected features/functionality to the Product A Installation Process 1304 in step 2406, which then determines what prerequisite components are required for the selected features/functionality in step 2408. At this point, the Product A Installation Process 1304 may issue a query to the Install Proxy 1306 to identify any prerequisite components that can be re-used in step 2410. In this example, the Install Proxy 1306 issues a query to the Configuration Management Database (CMDB) 1310 to find information to identify any application server(s) that can be used for the product runtime in step 2412. Further, in this example, there are no application servers that are available for use as part of the Product A installation. In response, the CMDB 1310 returns a component information response to the Install Proxy 1306 in step 2414, and the Product A Installation Process 1304 in step 2416, which then notifies the Installation Administrator 1302 about the options for re-use in step 2418. This could occur if no appropriate app servers are found (as judged by the Install Administrator 1302), or if no re-usable app servers could be found (for example, based on the app servers being marked as "not available for re-use" in CMDB. The same situation could occur if none of the re-usable app servers were "acceptable" to the Installation Administrator 1302 (and so the Installation Administrator 1302 selected the "install new application server" option as part of the component selection process). The Installation Administrator 1302 is given the option of specifying a new (in-line) installation and may also be given the option of cancelling the entire installation as part of step 2418. Once the Installation Administrator 1302 selects the appropriate in-line component installation option in step 2420, the Product A Installation Process 1304 hands over control to the Install Proxy 1306 for the installation of the required component in step 2422. Once invoked, the Install Proxy 1306 brokers or provides for installation of the required component by invoking the Component Install Process 1308, step 2424, which performs an in-line installation of the required component in conjunction with the Install Administrator 1302, step 2426 (which may in turn involve interaction with the Install Administrator, 1302). Upon installation of the required component, the Component Install Process 1308 passes control to the Install Proxy 1306, step 2428, and then to the Product A Install Process 1304, step 2430, which proceeds against the newly installed selected components. The Product A Install Process may prompt for information required for the installation of the product against the component (step 2432). This additional, component specific information is provided by the Install Admin 1302, step 2434. Based on all of this, the Product A Installation Process 1304 now installs the product against the selected components, step 2440, and updates CMDB as required, step 2442.

Figure 25:
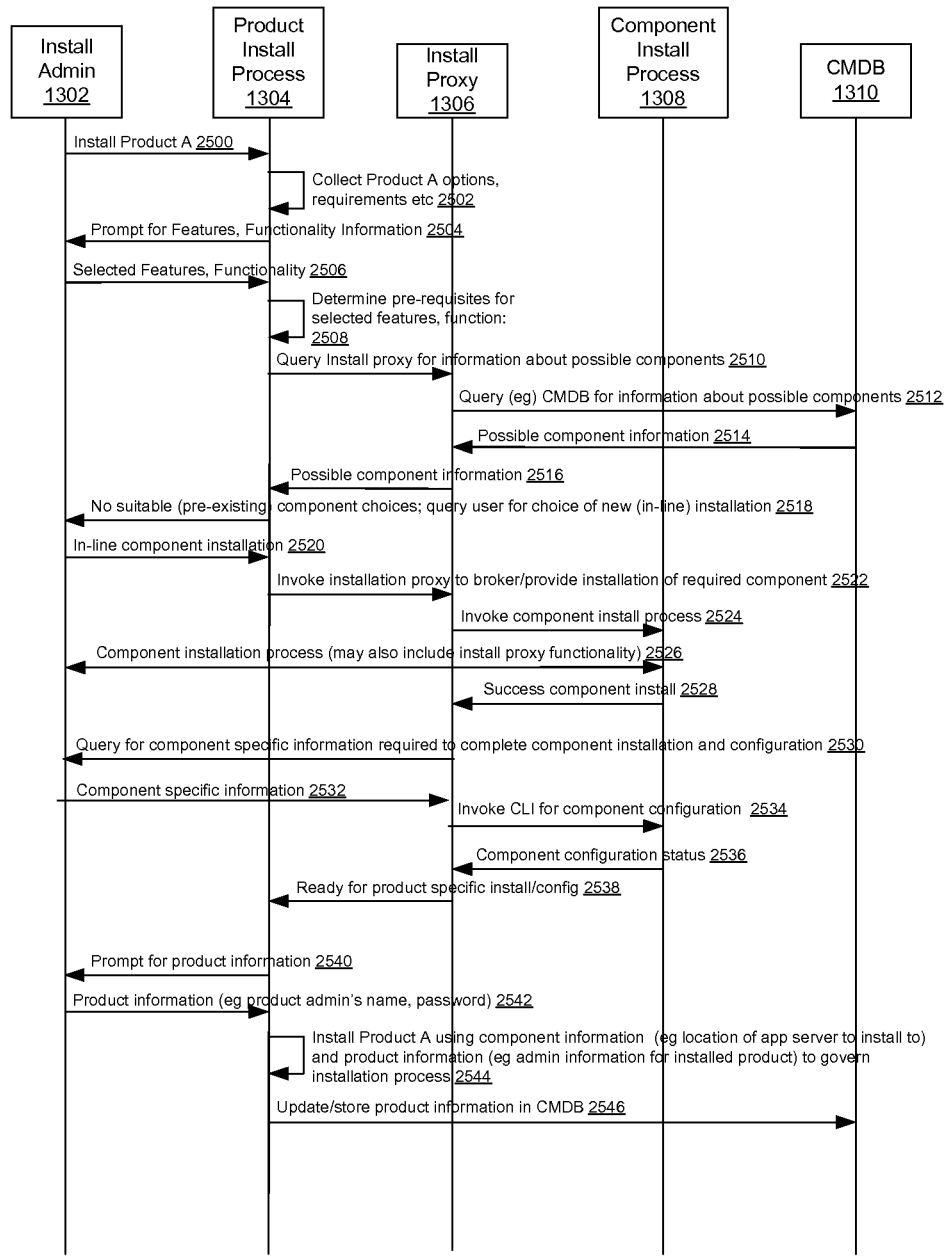

There may be other situations where the Install Proxy 1306 may be used to perform a brand new installation of a prerequisite component, such as is illustrated in FIG. 25 which shows an example in which the Install Proxy 1306 serves to control the installation process. The process is quite similar to the sequence depicted in FIG. 24, up through the initial installation of a required component, step 2528. Instead of returning control to the Product A Install Process 1304, however, the Install Proxy 1306 queries the administrator for additional information, step 2530, required for the runtime configuration of the component, in anticipation of the deployment of the product against this component. The Install Administrator 1302 returns this component specific information, step 2532, such as the configuration of an LDAP Directory Information Tree (DIT) structure for a newly installed LDAP instance. This information is then used by the Install Proxy 1306 with a command line interface for the configuration of the component, step 2534. In response to a successful configuration, step 2536, the Install Proxy returns control to the Product A Installation Process 1304, which will then continue with the product installation, steps 2540-2544. Based on all of this, the Product A Installation Process 1304 now installs the product against the selected components, and upon successful installation, the Product Install Process 1304 may send the assembled information to the CMDB 1310 so that it is kept current.

Figure 26:
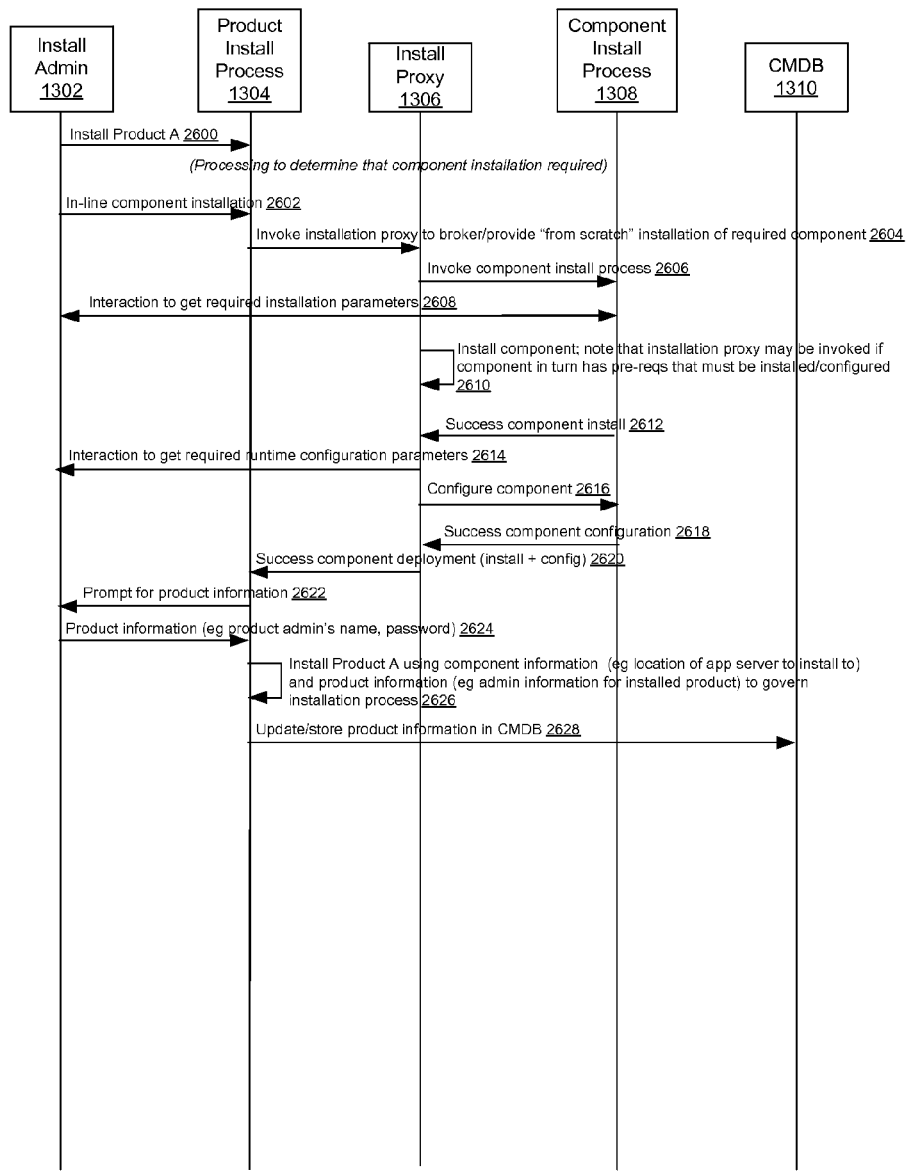

Turning now to FIG. 26, there is illustrated the use of the Install Proxy 1306 to broker a brand new installation and configuration of a required component. Beginning with the Installation Administrator 1302 deciding to install a product ("Install Product A"), step 2600, the process is quite similar to the sequence depicted in FIG. 25 down to the point where the Installation Administrator 1302 is notified that there are no re-usable components, or otherwise selects the installation of a new component, as indicated by the parenthetical reference to "Processing to determine that component installation is required." In response, the Installation Administrator 1302 provides information specifying a new (in-line) installation to the Product Install Process 1304, step 2602, which then invokes the Install Proxy 1306 to broker or provide for installation of the required component, step 2604, by invoking the Component Install Process 1308, step 2606, which performs an in-line installation of the required component in conjunction with the Install Administrator 1302, step 2608, which in turn may represent multiple interactions with the Install Admin 1302, and step 2610, during which the component install is undertaken. Upon installation of the required component the Component Install Process 1308 passes control to the Install Proxy 1306, step 2612, which interacts with the Install Administrator 1302 to obtain the required runtime configuration parameters, step 2614. When the required configuration parameters are returned, the Install Proxy 1306 invokes the Component Install Process 1308 to configure the component, step 2616. The component configuration status is returned to the Install Proxy 1306, step 2618, which then reports to the Product A Install Process 1304 that the component was successfully deployed (installed and configured), step 2620. Once all components have been successfully installed and configured, the Product A Install Process 1304 requests and receives information required for product installation (e.g., the administrators name and password) from the Installation Administrator 1302, step 2622 and 2624. Based on all of this, the Product A Installation Process 1304 now installs the product against the selected components, step 2626. At this point, the Product Install Process 1304 may send the assembled information to the CMDB 1310 so that it is kept current, step 2628.

Figure 27:
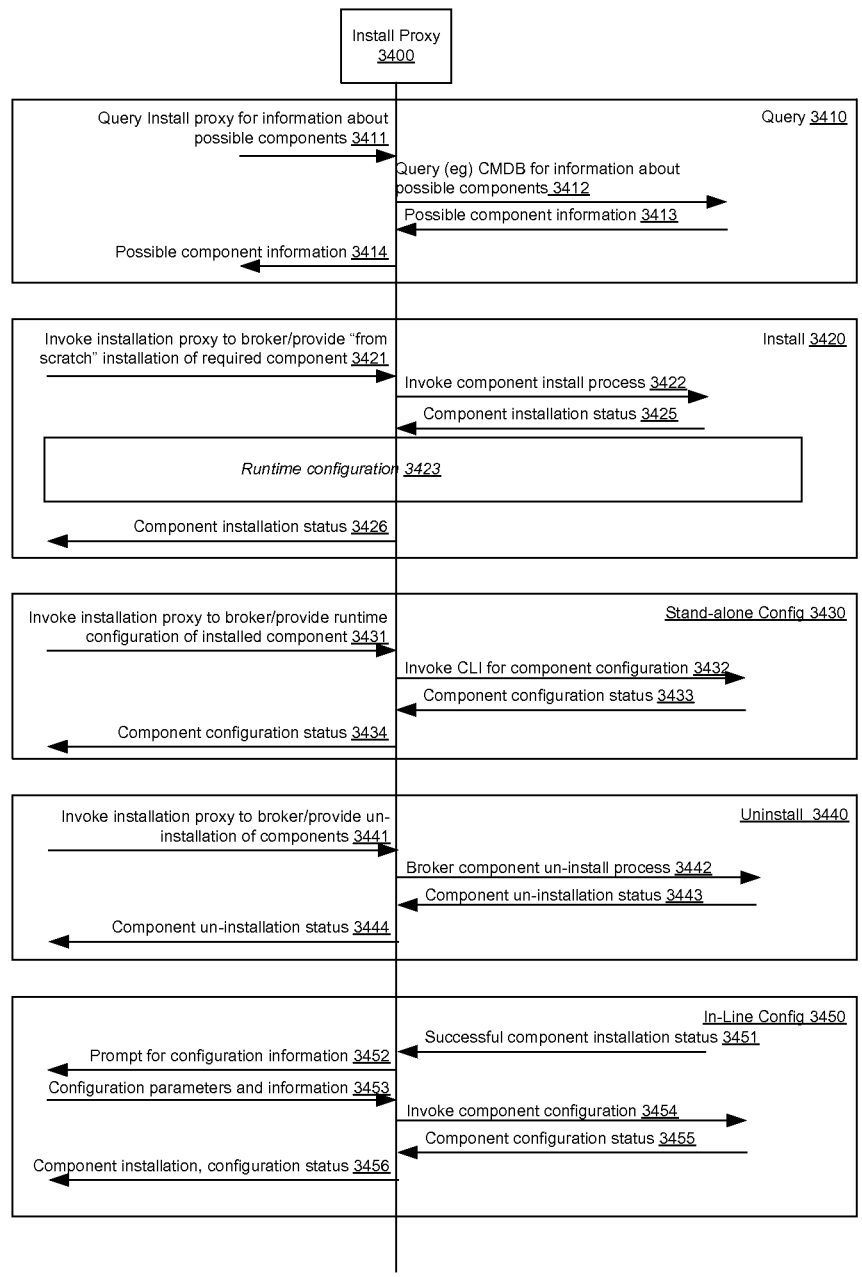
FIG. 27 illustrates the install proxy functionality.

Turning now to FIG. 27, there is illustrated the functionality of the install proxy 3400 which performs query operations 3410, install operations 3420, config operations 3430 and uninstall operations 3440. With respect to the query functionality 3410, install proxy 3400 receives queries 3411 for information about possible components. In response to the query 3411, the install proxy 3400 brokers interactions with a data source entity, such as a Configuration Management Database (CMDB), where information about installed products is maintained. This may be accomplished by sending a query 3412 to the CMDB to identify any available, re-usable components. The CMDB provides a data store of products that may act as prerequisite components of a product. For example, J2EE-based products require a J2EE platform, such as found with the WebSphere Application Server. As another example, products may require a LDAP repository for user management. The CMDB will store information about the deployed products within an environment, including WAS and LDAP, and this information is returned in a response 3413 to the install proxy 3400, which then forwards the response 3414 in response to the original query 3411.

As for the install functionality 3420, install proxy 3400 is invoked with a request 3421 for the install proxy 3400 to provide for installation of a required component, when a suitable component is not found as a result of the query operation. In response to the query 3421, the install proxy 3400 invokes an existing component or product's installation process (request 3422) to install and configure the required component in-line as part of the installing product's installation process. This may be accomplished by sending an invocation 3422 to the component installation process, which returns a status report 3425 that is forwarded in the response 3426 in response to the original query 3421. Optionally, if the installation of the component requires runtime configuration in addition to the installation-required configuration information, this may occur before the successful component installation response is reported back to the product installation, however the more optimal solution is for the install proxy to invoke the component run-time configuration AFTER it has evaluated a successful installation of the component, as indicated in FIG. 27. This is represented by step 3423, runtime configuration, which may or may not involve interaction with the Install Proxy 3400.

The install proxy 3400 also includes a configuration functionality 3430 which is invoked with a request 3431 for the install proxy 3400 to broker/provide for the runtime configuration of a pre-requisite component. In response to the query 3431, the install proxy 3400 handles the component configuration, typically by taking advantage of command line interface (CLI) functionality to configure the component without having to invoke the component's explicitly graphical user interface (GUI) based component management (request 3432). This may be accomplished by sending an invocation 3432 to the component installation process, which returns a component configuration status report 3433 that is forwarded in the response 3434 in response to the original query 3431.

As will be appreciated, the Install Proxy 3400 handles uninstall operations 3440 in the same way. Thus, in response to a request 3441 for the install proxy 3400 to provide for un-installation of a required component, the install proxy 3400 brokers an existing component or product's un-install process (request 3442), which returns a component un-install status report 3443 that is forwarded in the response 3444 in response to the original query 3441. As with the config processing (3440), the uninstall processing brokered by the Install Proxy is ideally implemented such that there is no "pop up" of the component's GUI-guided uninstall process, relying instead on an under-the-covers uninstall process. Note that this processing leverages the same intelligence as provided in the installation process, so that a shared (re-used) component is not uninstalled (although configuration specific information may be removed) and product-specific components (not available for re-use) are uninstalled as part of the software product uninstallation.

As will be appreciated by one skilled in the art, the present invention has been described in the context of an exemplary fully functioning data processing system, but may be embodied in whole or in part as a method, system, or computer program product. Furthermore, the present invention may take the form of a computer program product or instructions on a computer readable medium having computer-usable program code embodied in the medium. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. In addition, the present invention may take the form of an entirely software embodiment (including firmware, resident software, micro-code, etc.), an entirely hardware embodiment, or an embodiment combining software and hardware aspects that may all generally be referred to herein as a "circuit," "module" or "system." For example, the functions of time epoch module may be implemented in software instructions or program code stored in the kernel layer of a data processing system.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A process-implemented method for installing a software product within a data processing system, the method comprising:
   identifying, for a software product, one or more prerequisite components during an installation process flow for the software product;
   building, for one or more of the prerequisite components, a list of a plurality of provider options comprising a first provider option that identifies a re-usable component that has previously been installed;
   displaying information identifying a first prerequisite component along with a corresponding list of the plurality of provider options for the first prerequisite component comprising the first provider option that identifies the re-usable component that has previously been installed for the first prerequisite component;
   receiving a user selection of the first provider option; and
   invoking, within the installation process flow for the software product, a component configuration process flow for the re-usable component identified by the first provider option.

2. The method of claim 1, where building a list of a plurality of provider options comprises accessing a deployed product itemization data store which stores information identifying provider options for the plurality of previously deployed components in a distributed data processing system.

3. The method of claim 1, where receiving a user selection of the first provider option comprises receiving a selection for a specific re-usable component, selected from the list of available components.

4. The method of claim 1, where building a list of a plurality of provider options comprises excluding from the list any provider option for a component that is not available for re-use.

5. The method of claim 1, further comprising:
   collecting required configuration information for the re-usable component; and
   configuring the re-usable component using the required configuration information.

6. The method of claim 5, where collecting required configuration information comprises accessing configuration data for the re-usable component by accessing a configuration management data store.

7. The method of claim 6, where collecting required configuration information comprises collecting configuration information from the user that is used to provide additional runtime configuration of the re-usable component.

8. A non-transitory computer-usable medium embodying computer program code, the computer program code comprising computer executable instructions configured for installing and configuring one or more prerequisite components in a data processing system by:
   identifying, for a software product, one or more prerequisite components during an installation process flow for the software product;
   building, for one or more of the prerequisite components, a list of a plurality of provider options comprising a first provider option that identifies a re-usable component that has previously been installed;
   receiving a user selection of the first provider option; and
   invoking, within the installation process flow for the software product, a component configuration process flow for the re-usable component identified by the first provider option.

9. The non-transitory computer-usable medium of claim 8, where building a list of a plurality of provider options comprises accessing a deployed product itemization data store which stores information identifying provider options for the plurality of previously deployed components in a distributed data processing system.

10. The non-transitory computer-usable medium of claim 8, where receiving a user selection of the first provider option comprises receiving a selection for a specific re-usable component, selected from the list of available components.

11. The non-transitory computer-usable medium of claim 8, where building a list of a plurality of provider options comprises excluding from the list any provider option for a component that is not available for re-use.

12. The non-transitory computer-usable medium of claim 8, wherein the embodied computer program code further comprises computer executable instructions configured for:
   collecting required configuration information for the re-usable component; and
   configuring the re-usable component using the required configuration information.

13. The non-transitory computer-usable medium of claim 12, where collecting required configuration information comprises accessing configuration data for the re-usable component by accessing a configuration management data store.

14. A data processing system comprising:
   a processor;
   a data bus coupled to the processor; and
   a computer-usable medium embodying computer program code, the computer-usable medium being coupled to the data bus, the computer program code comprising instructions executable by the processor and configured for installing and configuring one or more prerequisite components in the data processing system by:
   identifying, for a software product, one or more prerequisite components during an installation process flow for the software product;
   building, for one or more of the prerequisite components, a list of a plurality of provider options comprising a first provider option that identifies a re-usable component that has previously been installed;
   receiving a user selection of the first provider option; and
   invoking, within the installation process flow for the software product, a component configuration process flow for the re-usable component identified by the first provider option.

15. The data processing system of claim 14, where building a list of a plurality of provider options comprises accessing a deployed product itemization data store which stores information identifying provider options for the plurality of previously deployed components in a distributed data processing system.

16. The data processing system of claim 14, where receiving a user selection of the first provider option comprises receiving a selection for a specific re-usable component, selected from the list of available components.

17. The data processing system of claim 14, where building a list of a plurality of provider options comprises excluding from the list any provider option for a component that is not available for re-use.

18. The data processing system of claim 14, wherein the embodied computer program code further comprises computer executable instructions configured for:
   collecting required configuration information for the re-usable component; and
   configuring the re-usable component using the required configuration information.

19. The data processing system of claim 18, where collecting required configuration information comprises accessing configuration data for the re-usable component by accessing a configuration management data store.

20. The data processing system of claim 19, where collecting required configuration information comprises collecting configuration information from the user that is used to provide additional runtime configuration of the re-usable component.

\* \* \* \* \*